(12) United States Patent
Hwang et al.

(10) Patent No.: US 11,937,304 B2
(45) Date of Patent: Mar. 19, 2024

(54) METHOD FOR REPORTING RADIO LINK FAILURE IN WIRELESS COMMUNICATION SYSTEM, AND DEVICE THEREFOR

(71) Applicant: Samsung Electronics Co., Ltd., Suwon-si (KR)

(72) Inventors: June Hwang, Suwon-si (KR); Soenghun Kim, Suwon-si (KR); Sangbum Kim, Suwon-si (KR); Jaehyuk Jang, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 323 days.

(21) Appl. No.: 17/256,427

(22) PCT Filed: Jul. 1, 2019

(86) PCT No.: PCT/KR2019/007976
§ 371 (c)(1),
(2) Date: Dec. 28, 2020

(87) PCT Pub. No.: WO2020/005043
PCT Pub. Date: Jan. 2, 2020

(65) Prior Publication Data
US 2021/0274559 A1   Sep. 2, 2021

(30) Foreign Application Priority Data

Jun. 29, 2018 (KR) ........................ 10-2018-0076115

(51) Int. Cl.
*H04W 74/08*   (2009.01)
*H04L 5/00*   (2006.01)
(Continued)

(52) U.S. Cl.
CPC ...... *H04W 74/0833* (2013.01); *H04L 41/0677* (2013.01); *H04L 5/0048* (2013.01); *H04W 56/001* (2013.01)

(58) Field of Classification Search
CPC ............ H04W 74/0833; H04W 24/10; H04W 56/001
See application file for complete search history.

(56) References Cited

U.S. PATENT DOCUMENTS 8,620,367 B2   12/2013   Jeong et al.
9,521,565 B2   12/2016   Tenny et al.
(Continued)

FOREIGN PATENT DOCUMENTS

CN   103385026 A   11/2013
CN   103907325 A   7/2014
(Continued)

OTHER PUBLICATIONS

Sharp, "Considerations on Acquisition of an SI Message", R2-1807328, 3GPP TSG RAN WG2 Meeting #102, May 11, 2018.
(Continued)

*Primary Examiner* — Gary Mui
(74) *Attorney, Agent, or Firm* — Jefferson IP Law, LLP

(57) ABSTRACT

A user equipment for transmitting and receiving a signal in a wireless communication system, includes: a transceiver; and at least one processor configured to perform a random access procedure with a base station and record log information that is information related to the random access procedure, wherein the random access procedure includes transmitting a random access preamble to the base station and receiving, from the base station, a random access response that is a response to the transmission of the random access preamble.

16 Claims, 24 Drawing Sheets

(51) Int. Cl.
*H04L 41/0677* (2022.01)
*H04W 56/00* (2009.01)

(56) References Cited

U.S. PATENT DOCUMENTS

| | | | | |
|---|---|---|---|---|
| 2010/0208597 | A1* | 8/2010 | Chun | H04W 74/002 370/252 |
| 2013/0265942 | A1* | 10/2013 | Lu | H04W 24/02 370/328 |
| 2014/0241285 | A1* | 8/2014 | Pang | H04W 74/0833 370/329 |
| 2014/0301330 | A1 | 10/2014 | Lee et al. | |
| 2016/0270121 | A1* | 9/2016 | Bergström | H04W 74/0833 |
| 2016/0295609 | A1 | 10/2016 | Vajapeyam et al. | |
| 2018/0034515 | A1* | 2/2018 | Guo | H04B 7/0686 |
| 2018/0176836 | A1 | 6/2018 | Da Silva et al. | |
| 2019/0028905 | A1* | 1/2019 | Veeramallu | H04W 4/70 |
| 2019/0052334 | A1* | 2/2019 | Jeon | H04W 72/042 |
| 2019/0215874 | A1* | 7/2019 | Chen | H04L 5/0051 |
| 2019/0364599 | A1* | 11/2019 | Islam | H04L 5/0048 |
| 2020/0059967 | A1* | 2/2020 | Kim | H04L 1/0026 |
| 2020/0344685 | A1 | 10/2020 | Yi et al. | |
| 2021/0195657 | A1* | 6/2021 | Wu | H04W 74/04 |

FOREIGN PATENT DOCUMENTS

| | | |
|---|---|---|
| KR | 10-2009-0131650 A | 12/2009 |
| KR | 10-2011-0089350 A | 8/2011 |
| KR | 10-2017-0134398 A | 12/2017 |
| WO | 2017/134556 A1 | 8/2017 |
| WO | 2018/110857 A1 | 6/2018 |

OTHER PUBLICATIONS

3GPP TS 36.331 V15.2.1, '3GPP; TSG RAN; E-UTRA; RRC; Protocol specification (Release 15)', Jun. 21, 2018.
International Search Report dated Oct. 11, 2019, issued in International Patent Application No. PCT/KR2019/007976.
Qualcomm Incorporated, "Beam reporting and refinement during handover", R2-1713890-XP 51372526 A(2017).
Huawei, HiSilicon, "Introduction of Bluetooth and WLAN measurement collection in MDT", R2-1805486-XP 51415086 A(2018).
Extended European Search Report dated Jul. 29, 2021, issued in European Patent Application No. 19825879.0-1215.
Korean Office Action dated Nov. 10, 2022, issued in Korean Patent Application No. 10-2018-0076115.
Indian Office Action dated Aug. 30, 2022, issued in Indian Patent Application No. 202137000747.
3rd Generation Partnership Project; Technical Specification Group Radio Access Network; Evolved Universal Terrestrial Radio Access (E-UTRA); Radio Resource Control (RRC); Protocol specification (Release 15), 3GPP TS 36.331 V15.1.0, Mar. 2018.
Korean Notice of Allowance dated May 25, 2023, issued in Korean Patent Application No. 10-2018-0076115.
Chinese Office Action dated Sep. 23, 2023, issued in Chinese Application No. 201980044114.7.

* cited by examiner

FIG. 14
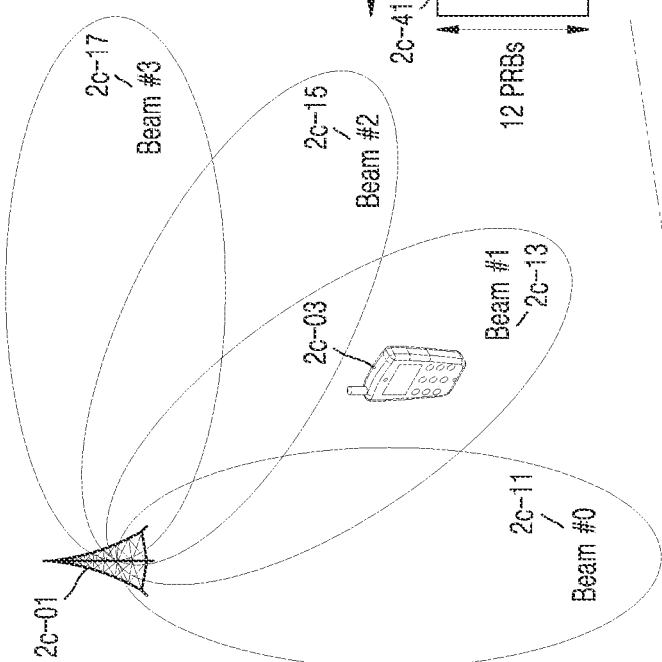
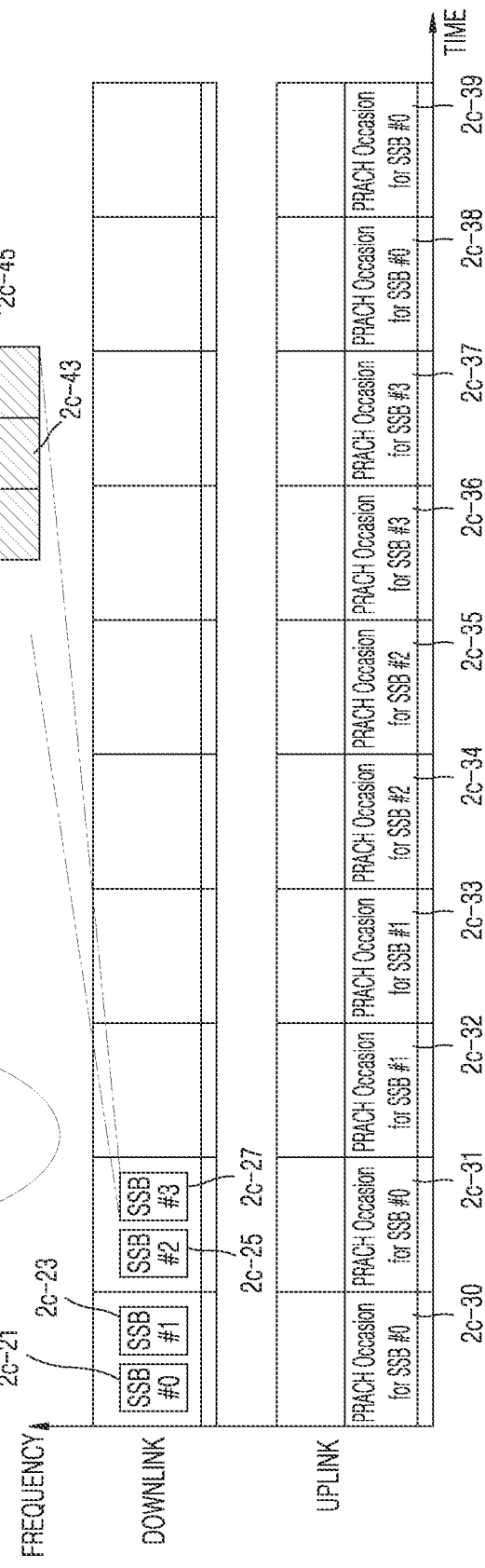

METHOD FOR REPORTING RADIO LINK FAILURE IN WIRELESS COMMUNICATION SYSTEM, AND DEVICE THEREFOR

TECHNICAL FIELD

The present disclosure relates to a method and apparatus for reporting radio link failure in a mobile communication system.

BACKGROUND ART

To meet the increase in demand for wireless data traffic after the commercialization of $4^{th}$ generation (4G) communication systems, considerable efforts have been made to develop pre-$5^{th}$ generation (5G) communication systems or 5G communication systems. This is one reason why '5G communication systems' or 'pre-5G communication systems' are called 'beyond 4G network communication systems' or 'post Long-Term Evolution (LTE) systems.' The 5G communication system defined in 3GPP is referred to as a new radio (NR) system. In order to achieve a high data rate, 5G communication systems are being developed to be implemented in a super-high frequency band (millimeter wave (mmWave)), e.g., a band of 60 GHz. In order to reduce the path loss of radio waves in such a super-high frequency band and to increase a transmission distance of radio waves in 5G communication systems, various technologies are being studied. for example: beamforming, massive multiple-input multiple-output (MIMO), full dimensional MIMO (FD-MIMO), array antennas, analog beam-forming, and large-scale antennas, and have been applied to NR systems. In order to improve system networks for 5G communication systems, various technologies have been developed, e.g., evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation. Also, for 5G communication systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA) and sparse code multiple access (SCMA), which are advanced access schemes.

The Internet has evolved from a human-based connection network, where humans create and consume information, to the Internet of Things (IoT), where distributed configurations, such as objects, exchange information with each other to process the information. Internet of everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, machine to machine (M2M) communication, machine type communication (MTC), etc. have been studied. In the IoT environment, intelligent Internet technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, 5G communication such as sensor networks, M2M communication, MTC, etc., are being implemented by using techniques such as beam-forming, MIMO, array antennas, etc. The application of cloud radio access network (RAN) as a big data processing technology described above may be an example of convergence of 5G communication technology and IoT technology.

As described above, various services are able to be provided due to the development of mobile communication systems, and thus, there is need for methods of effectively providing such services.

DESCRIPTION OF EMBODIMENTS

Technical Problem

Provided is a method for effectively providing various services in a mobile communication system.

Technical Solution to Problem

According to an embodiment, a user equipment for transmitting and receiving a signal in a wireless communication system includes: a transceiver; and at least one processor configured to perform a random access procedure with a base station and record log information that is information related to the random access procedure, wherein the random access procedure includes transmitting a random access preamble to the base station and receiving, from the base station, a random access response that is a response to the transmission of the random access preamble.

Advantageous Effects of Disclosure

According to embodiments, provided are an apparatus and method for effectively providing a service in a mobile communication system.

BRIEF DESCRIPTION OF DRAWINGS

FIG. 14 is a diagram for describing downlink and uplink channel frame structures when an NR system performs beam-based communication, according to an embodiment.

BEST MODE

Figure 1:
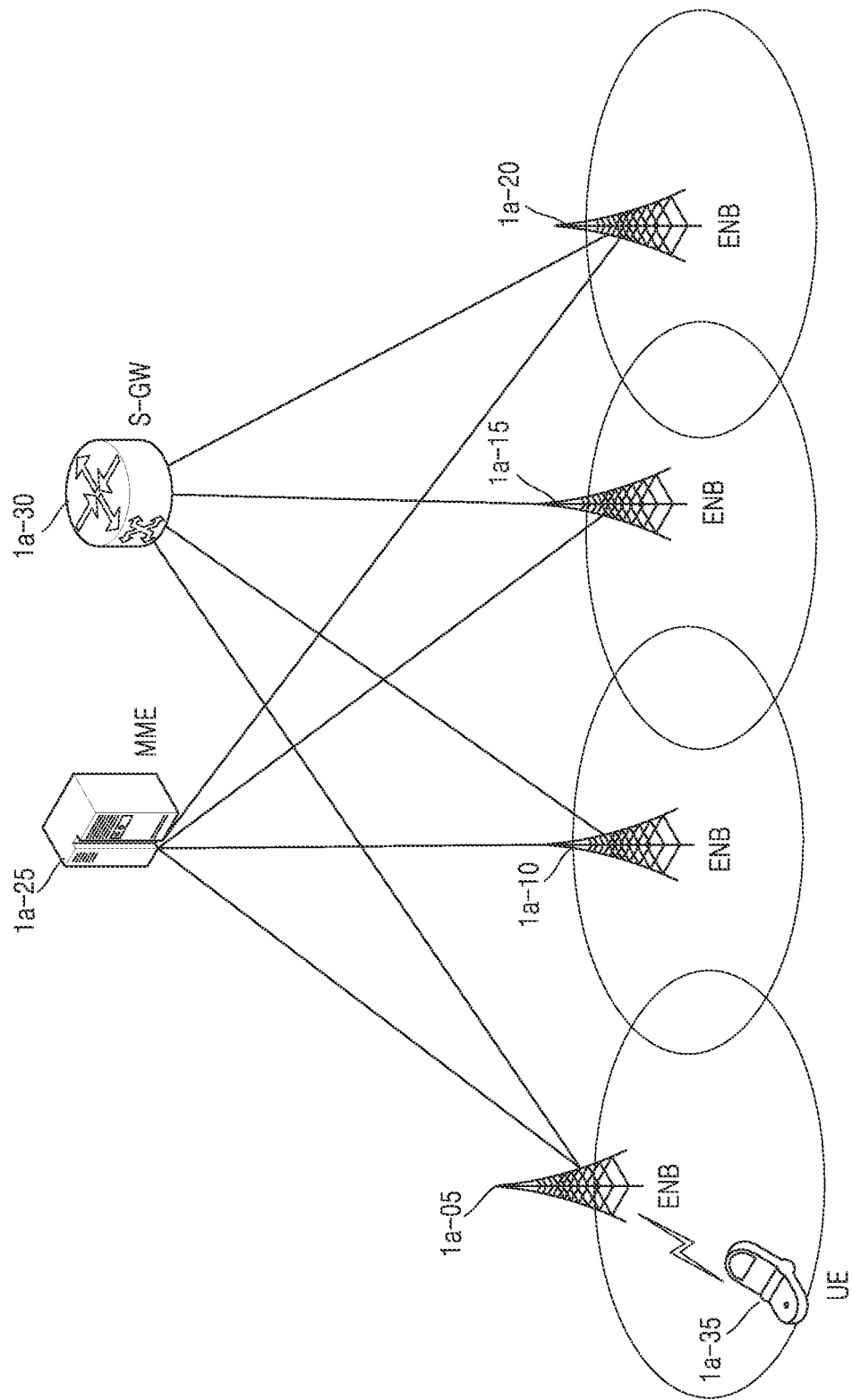
FIG. 1 is a diagram of a structure of a long-term evolution (LTE) system, according to an embodiment.

According to an embodiment, a user equipment for transmitting and receiving a signal in a wireless communication system, includes: a transceiver; and at least one processor configured to perform a random access procedure with a base station and record log information that is information related to the random access procedure, wherein the random access procedure includes transmitting a random access preamble to the base station and receiving, from the base station, a random access response that is a response to the transmission of the random access preamble.

MODE OF DISCLOSURE

Hereinafter, embodiments of the present disclosure will be described with reference to accompanying drawings.

In describing the embodiments, descriptions of technical contents that are well known in the technical field to which the present disclosure belongs and are not directly related to the present disclosure will be omitted. By omitting the unnecessary description, the gist of the present disclosure may be more clearly conveyed without obscuring the subject matter.

For the same reasons, components may be exaggerated, omitted, or schematically illustrated in drawings for clarity. Also, the size of each component does not completely reflect the actual size. In the drawings, like reference numerals denote like elements.

Advantages and features of the present disclosure and methods of accomplishing the same may be understood more readily by reference to the following detailed description of the embodiments and the accompanying drawings. In this regard, the embodiments of the present disclosure may have different forms and should not be construed as being limited to the descriptions set forth herein. Rather, these embodiments are provided so that the present disclosure will be thorough and complete and will fully convey the concept of the present disclosure to one of ordinary skill in the art, and the present disclosure will only be defined by the appended claims. Throughout the specification, like reference numerals denote like elements.

Here, it will be understood that combinations of blocks in flowcharts or process flow diagrams may be performed by computer program instructions. Because these computer program instructions may be loaded into a processor of a general-purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-executable or computer-readable memory capable of directing a computer or another programmable data processing apparatus to implement a function in a particular manner, and thus the instructions stored in the computer-executable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" used in the embodiments means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. Also, in the embodiments, the "unit" may include at least one processor.

Also, terms for identifying access nodes, terms denoting network entities, terms denoting messages, terms denoting interfaces between network entities, terms denoting various types of identification information, etc. used herein are exemplified for convenience of description. Thus, the terms used in the present disclosure are not limited and other terms denoting targets having the same technical meanings may be used.

Hereinafter, for convenience of description, the present disclosure uses terms and names defined in the standards for a $5^{th}$ generation (5G), new ratio (NR), or long-term evolution (LTE) system. However, the present disclosure is not limited by such terms and names, and may be equally applied to systems conforming to other standards.

In other words, in describing the embodiments of the present disclosure in detail, the communication standard set by the $3^{rd}$ generation partnership project (3GPP) will be the main target, but the main gist of the present disclosure is also applicable to other communication systems having a similar technical background with slight modifications within a range not significantly departing from the scope of the present disclosure, and such application may be possible at the judgment of one of ordinary skill in the art.

FIG. 1 is a diagram of a structure of an LTE system, according to an embodiment.

Referring to FIG. 1, as illustrated, a radio access network of the LTE system may include a plurality of base stations (evolved node Bs (eNBs) 1a-05 through 1a-20, a mobility management entity (MME) 1a-25, and a serving gateway (S-GW) 1a-30. A user equipment (UE) or a terminal 1a-35 may access an external network via the base station 1a-05, 1a-10, 1a-15, or 1a-20 and the S-GW 1a-30.

The base stations 1a-05 through 1a-20 are access nodes of a cellular network and may provide wireless access to UEs accessing a network. In other words, the base stations 1a-05 through 1a-20 may collect status information, such as buffer statuses of UEs, available transmission power statuses, and channel statuses, and perform scheduling to service traffic of users, thereby supporting connections between UEs and a core network (CN). The MME 1a-25 is an entity for performing a mobility management function and various control functions for the UE and may be connected to multiple base stations. The S-GW 1a-30 is an entity for providing a data bearer. Also, the MME 1a-25 and the S-GW 1a-30 may perform authentication and bearer management on a UE accessing a network, and may process a packet arrived from the base station 1a-05, 1a-10, 1a-15, or 1a-20 or a packet to be transmitted to the base station 1a-05, 1a-10, 1a-15, or 1a-20.

Figure 2:
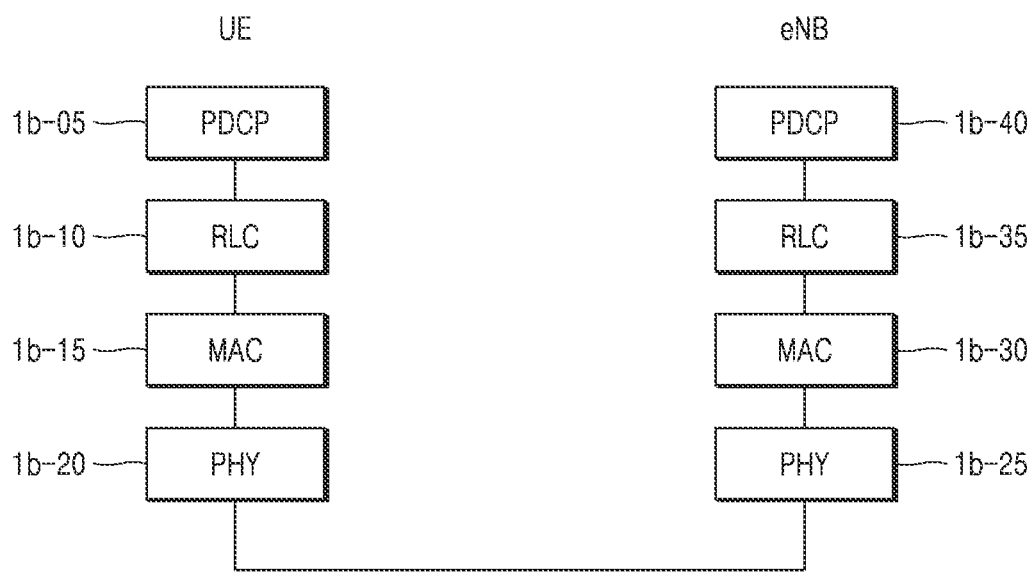
FIG. 2 is a diagram of a radio protocol architecture in an LTE system to which an embodiment is applied.

FIG. 2 is a diagram of a radio protocol architecture in an LTE system to which an embodiment is applied.

Referring to FIG. 2, a radio protocol of the LTE system may include packet data convergence protocol (PDCP) layers 1b-05 and 1b-40, radio link control (RLC) layers 1b-10 and 1b-35, and media access control (MAC) layers 1b-15 and 1b-30 respectively for a UE and an eNB. The PDCP layer 1a-05 and 1a-40 may perform operations such as internet protocol (IP) header compression/reconstruction. Main functions of the PDCP 1a-05 and 1a-40 layer may be summarized as below.
  Header compression and decompression: Robust header compression (ROHC) only
  Transfer of user data
  In-sequence delivery of upper layer protocol data units (PDUs) at PDCP re-establishment procedure for RLC acknowledged mode (AM)
  For split bearers in dual connectivity (DC) (only support for RLC AM): PDCP PDU routing for transmission and PDCP PDU reordering for reception
  Duplicate detection of lower layer service data units (SDUs) at PDCP re-establishment procedure for RLC AM
  Retransmission of PDCP SDUs at handover and, for split bearers in dual connectivity (DC), of PDCP PDUs at PDCP data-recovery procedure, for RLC AM
  Ciphering and deciphering
  Timer-based SDU discard in uplink The RLC layers 1b-10 and 1b-35 may perform, for example, an automatic repeat request (ARQ) operation by reconfiguring PDCP PDUs to appropriate sizes. Main functions of the RLC layers 1b-10 and 1b-35 may be summarized as below.
  Transfer of upper layer PDUs
  Error Correction through ARQ (only for AM data transfer)
  Concatenation, segmentation, and reassembly of RLC SDUs (only for unacknowledged mode (UM) and AM data transfer)
  Re-segmentation of RLC data PDUs (only for AM data transfer)
  Reordering of RLC data PDUs (only for UM and AM data transfer)
  Duplicate detection (only for UM and AM data transfer)
  Protocol error detection (only for AM data transfer)
  RLC SDU discard (only for UM and AM data transfer)
  RLC re-establishment The MAC layer 1b-15 and 1b-30 may be connected to several RLC layers configured in one UE. The MAC layer 1b-15 and 1b-30 may perform operations of multiplexing RLC PDUs in MAC PDU and demultiplexing RLC PDUs from MAC PDU. Main functions of the MAC layers 1b-15 and 1b-30 may be summarized as below.
  Mapping between logical channels and transport channels
  Multiplexing/demultiplexing of MAC SDUs belonging to one or different logical channels into/from transport block (TB) delivered to/from the physical layer on transport channels
  Scheduling information reporting
  Hybrid automatic repeat request (HARQ) function (Error correction through HARQ)
  Priority handling between logical channels of one UE
  Priority handling between UEs by means of dynamic scheduling
  Multimedia broadcast/multicast service (MBMS) service identification
  Transport format selection
  Padding Physical layers 1b-20 and 1b-25 may perform operations of channel-coding and modulating upper layer data and preparing an orthogonal frequency division multiplexing (OFDM) symbol to be transmitted via a radio channel. Also, the physical layers 1b-20 and 1b-25 may perform operations of demodulating and channel-decoding the OFDM symbol received via the radio channel, and transmitting the OFDM symbol to an upper layer.

Although not shown in FIG. 2, a radio resource control (RRC) layer may be present in each of upper layers of the PDCP layers 1b-05 and 1b-40 of the UE and base station. The RRC layer may exchange access and measurement-related configuration control messages for RRC.

Figure 3:
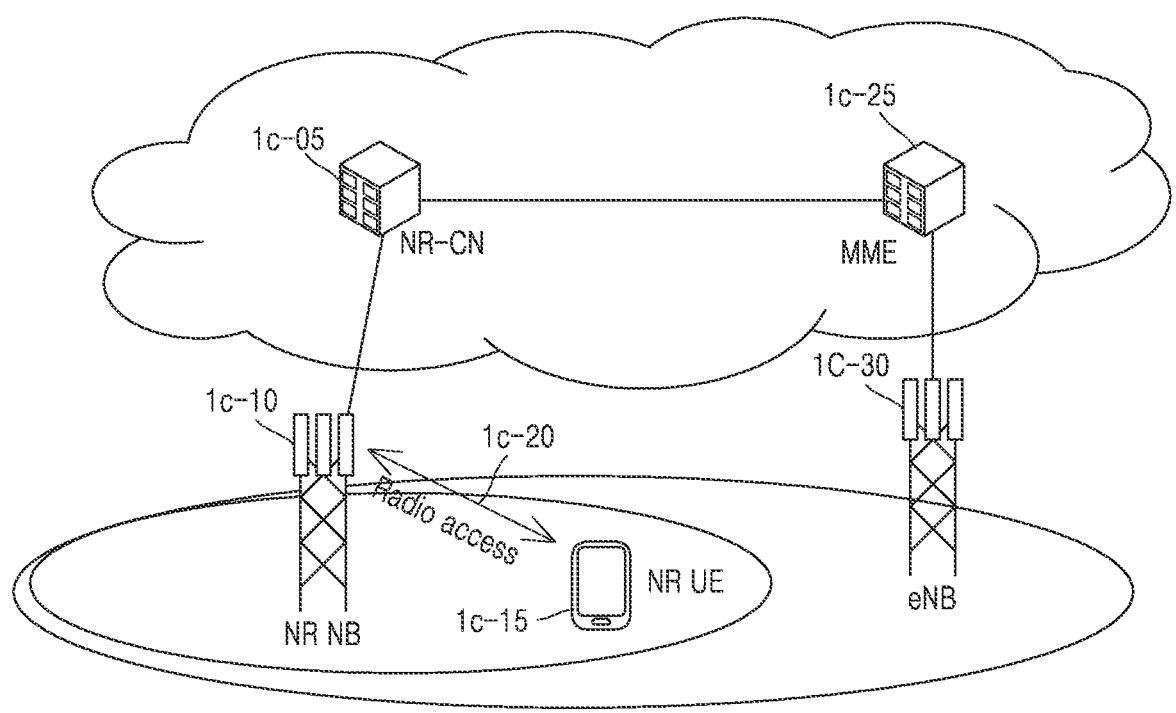
FIG. 3 is a diagram of a structure of a next-generation mobile communication system to which an embodiment is applied.

FIG. 3 is a diagram of a structure of a next-generation mobile communication system to which an embodiment is applied Referring to FIG. 3, as illustrated, a radio access network of the next-generation mobile communication system (5G or NR system) includes a new radio node B (NR NB, NR gNB, or NR base station) 1c-10 and a new radio core network (NR CN) or next generation core network (NG CN) 1c-05. A new radio user equipment (NR UE) or terminal 1c-15 may access an external network via the NR gNB 1c-10 and the NR CN 1c-05.

In FIG. 3, the NR gNB 1c-10 may correspond to an eNB of an LTE system. The NR gNB 1c-10 is connected to the NR UE 1c-15 through radio channels and may provide superior services compared to an existing NB. Because all user traffic data is serviced through shared channels in the next-generation mobile communication system, an entity for collating buffer status information of UEs, available transmission power status information, channel status information, etc. and performing scheduling is required and such operations may be performed by the NR gNB 1c-10. On NR gNB 1c-10 may generally control multiple cells and may include a central unit (CU) in charge of control and signaling and a distributed unit (DU) in charge of transmission and reception of a signal. The next-generation mobile communication system (5G or NR system) may have a maximum bandwidth greater than an existing maximum bandwidth of LTE to achieve an ultrahigh data rate, and beamforming technology may be additionally applied using OFDM as radio access technology. Also, adaptive modulation and coding (AMC) may be applied to determine a modulation scheme and a channel coding rate in accordance with a channel status of the UE 1c-15. The NR CN 1c-05 may perform functions including mobility support, bearer configuration, and quality of service (QoS) configuration. The NR CN 1c-05 is an entity for performing various control functions including a mobility management function for the UE 1c-15 and is connected to multiple base stations. The next generation mobile communication system (5G or NR system) may cooperate with the LTE system, and the NR CN 1c-05 may be connected to an MME 1c-25 through a network interface. The MME 1c-25 may be connected to an eNB 1c-30 that is a base station.

Figure 4:
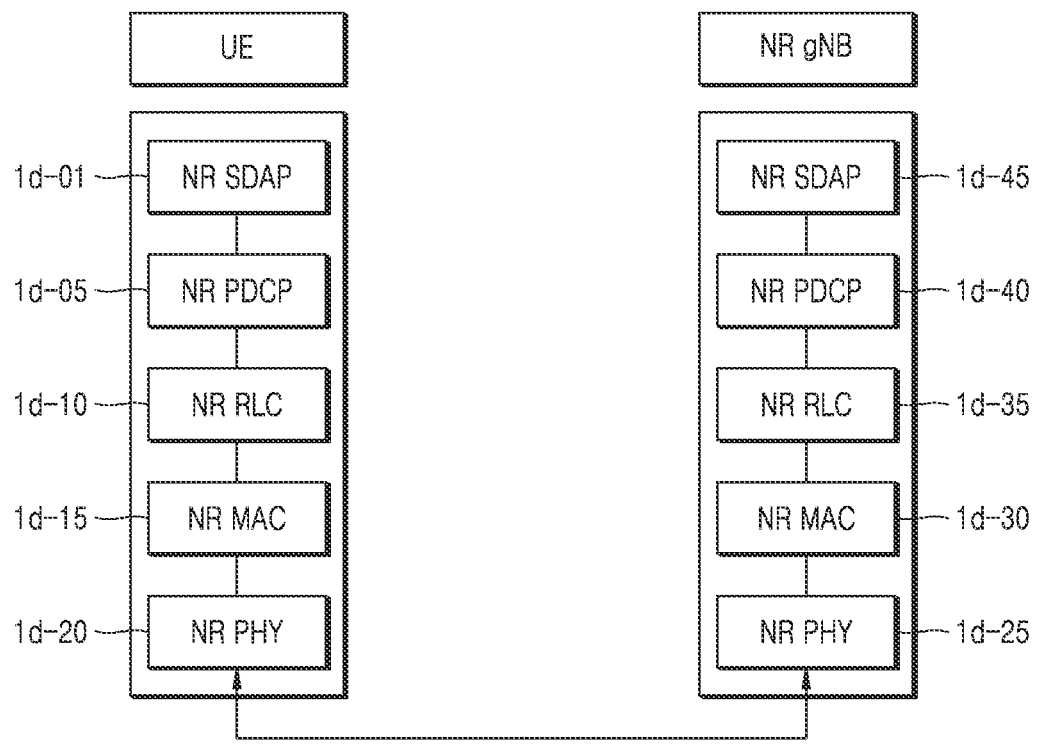
FIG. 4 is a diagram of a radio protocol architecture of a next-generation mobile communication system to which an embodiment is applied.

FIG. 4 is a diagram of a radio protocol architecture of a next-generation mobile communication system to which an embodiment is applied.

Referring to FIG. 4, a radio protocol of the next-generation mobile communication system (5G or NR system) includes NR service data adaptation protocol (SDAP) layers 1d-01 and 1d-45, NR PDCP layers 1d-05 and 1d-40, and NR RLC layers 1d-10 and 1d-35, and NR MAC layers 1d-15 and 1d-30 respectively for a UE and an NR base station.

Main functions of the NR SDAP layers 1d-01 and 1d-45 may include some of the following functions.
   Transfer of user plane data
   Mapping between QoS flow and a data radio bearer (DRB) for both downlink (DL) and DRAB uplink (UL)
   Marking QoS flow identification (ID) in both DL and UL packets
   Reflective QoS flow to DRB mapping for the UL SDAP PDUs With respect to the SDAP layers 1d-01 and 1d-45, the UE may receive, via an RRC message, configurations on whether to use a header of the SDAP layers 1d-01 and 1d-45 or use a function of the SDAP layers 1d-01 and 1d-45 for each PDCP layer, bearer, or logical channel. When an SDAP header is configured, the UE may instruct, by using a non-access stratum (NAS) reflective QoS 1-bit indicator and an access stratum (AS) reflective QoS 1-bit indicator of the SDAP header, updating or reconfiguring of mapping information regarding the data bearer and the QoS flow of UL and DL. The SDAP header may include QoS flow ID indicating QoS. QoS information may be used as data processing priority information, scheduling information, etc. for supporting a smooth service.

Main functions of the NR PDCP layers 1d-05 and 1d-40 may include some of the following functions.
   Header compression and decompression: ROHC only
   Transfer of user data
   In-sequence delivery of upper layer PDUs
   Out-of-sequence delivery of upper layer PDUs
   PDCP PDU reordering for reception
   Duplicate detection of lower layer SDUs
   Retransmission of PDCP SDUs
   Ciphering and deciphering
   Timer-based SDU discard in uplink A reordering function of the NR PDCP layers 1d-05 and 1d-40 may denote a function of reordering PDCP PDUs received from a lower layer, based on a PDCP sequence number (SN). The reordering function of the NR PDCP layers 1d-05 and 1d-40 may include at least one of a function of delivering the reordered data to an upper layer in order or a function of immediately delivering the reordered data without considering an order, a function of recording missing PDCP PDUs by reordering the PDCP PDUs, a function of reporting status information of the missing PDCP PDUs to a transmitter, and a function of requesting to retransmit the missing PDCP PDUs.

The main functions of the NR RLC layers 1d-10 and 1d-35 may include at least some of the following functions.
   Transfer of upper layer PDUs
   In-sequence delivery of upper layer PDUs
   Out-of-sequence delivery of upper layer PDUs
   Error correction through ARQ
   Concatenation, segmentation and reassembly of RLC SDUs
   Re-segmentation of RLC data PDUs
   Reordering of RLC data PDUs
   Duplicate detection
   Protocol error detection
   RLC SDU discard
   RLC re-establishment The in-sequence delivery function of the NR RLC layers 1d-10 and 1d-35 may denote a function of delivering RLC SDUs received from a lower layer, to an upper layer in order. The in-sequence delivery function of the NR RLC layers 1d-10 and 1d-35 may include at least one of a function of reassembling and transmitting several RLC SDUs when one RLC SDU is received by being split into the several RLC SDUs, a function of realigning received RLC PDUs based on an RLC SN or PDCP SN, a function of recording missing RLC PUDs by realigning an order, a function of reporting statuses of missing RLC PDUs to a transmission side, and a function of requesting retransmission of missing RLC PDUs. Also, when there is a missing RLC SDU, the in-sequence delivery function of the NR RLC layers 1d-10 and 1d-35 may include at least one of a function of transmitting only RLC SDUs up to the missing RLC SDU to an upper layer in an order, a function of transmitting, to an upper layer, all RLC SDUs received before a timer begins in an order when the timer is expired despite the missing RLC SDU, and a function of transmitting, to an upper layer, all RLC SDUs currently received in an order when a timer is expired despite the missing RLC SDU.

Further, according to the in-sequence function, the RLC PDUs may be processed in order of reception (in order of arrival regardless of sequence numbers) and the RLC PDUs may be delivered to a PDCP layer out of order (out-of sequence delivery), and segments to be received or stored in a buffer may be reassembled into a whole RLC PDU and processed, the RLC PDU may be delivered to the PDCP layer. The NR RLC layers 1d-10 and 1d-35 may not have a concatenation function, and the concatenation function may be performed by the NR MAC layers 1d-15 and 1d-30 or be replaced with a multiplexing function of the NR MAC layers 1d-15 and 1d-30.

Out-of-sequence delivery of the NR RLC layers 1d-10 and 1d-35 denotes a function of delivering RLC SDUs received from a lower layer, immediately to an upper layer out of an order. The out-of-sequence delivery may include a function of reassembling and delivering several RLC SDUs when one RLC SDU is split into the several RLC SDUs and received, and may include a function of recording missing RLC PDUs by storing RLC SN or PDCP SN and aligning received RLC PDUs in an order.

The NR MAC layers 1d-15 and 1d-30 may be connected to several NR RLC layers configured in one UE. The main functions of the NR MAC layers 1d-15 and 1d-30 may include at least some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding NR PHY layers 1d-20 and 1d-25 may channel-code and modulate upper layer data into OFDM symbols and transmit the OFDM symbols through a radio channel, or demodulate OFDM symbols received through a radio channel and channel-decode and deliver the OFDM symbols to an upper layer.

Figure 5:
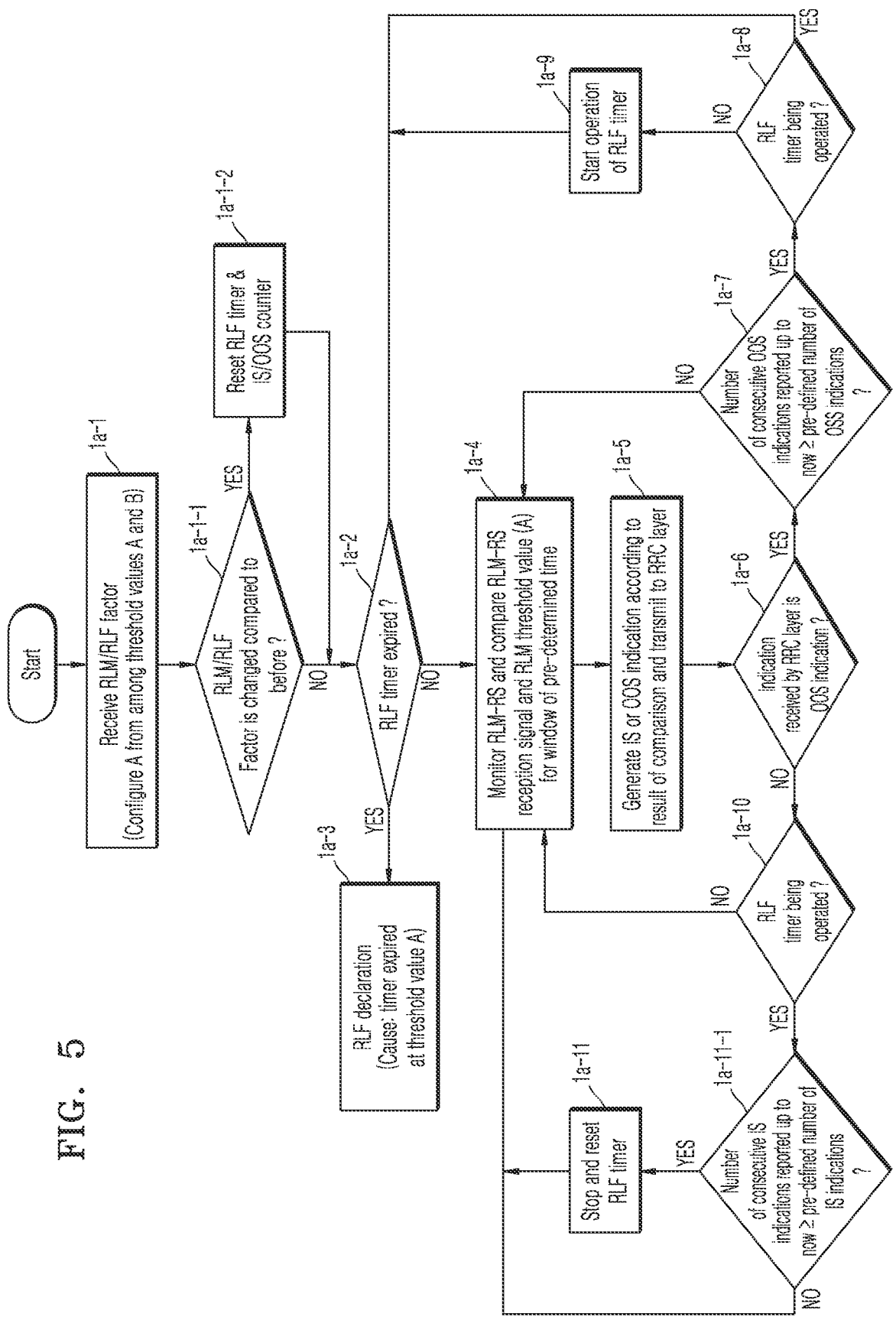
FIG. 5 is a diagram showing a radio link failure (RLF) declaration operation of a user equipment (UE), according to an embodiment.

FIG. 5 is a diagram showing a radio link failure (RLF) declaration operation of a UE, according to an embodiment. According to an embodiment, the UE of FIG. 5 may be configured with one threshold value set from among a plurality of available radio link monitoring (RLM) threshold value sets from a base station and perform an RLM/RLF operation based on the configured one threshold value set. The UE of FIG. 5 may declare RLF as a cause value of reflecting a used threshold value set.

In operation 1a-1, the UE may receive an RLM/RLF factor from the base station. The RLM/RLF factor may include at least one of a time of an RLM reference signal (RLM-RS), a frequency position, an index of a pre-defined RLM-RS, and an index of a pre-defined set of RLM-RSs.

Also, RLM threshold value information for comparing reception signals of RLM-RSs may be transmitted from the base station to the UE. An RLM threshold value may include values of reference signal received power (RSRP), reference signal received quality (RSRQ), received signal strength indicator (RSSI), target block error rate, or an index indicating determined values of pre-defined metrics.

When the RLM threshold value is RSRP, RSRQ, or RSSI, the UE may immediately compare a reception strength of the RLM-RS and the RLM threshold value. However, when the RLM threshold value is a target error rate value (e.g. the target block error rate), the UE may convert a strength of a reception signal corresponding to the target error rate value into the RLM threshold value and compare the reception strength of the RLM-RS and the converted value.

According to an embodiment, the RLM threshold value may be configured in a set. According to an embodiment, the RLM threshold value may be divided into an in-sync (IS) threshold value and an out-of-sync (OOS) threshold value. Based on characteristics of a provided service, the IS threshold value and the OOS threshold value for an A service may be configured and transmitted to the UE as one set. The IS and OOS threshold values may be separately present based on characteristics of each service. A serving base station may transmit, to the UE, an index indicating the set of IS and OOS threshold values while the IS and OOS threshold values for each service are pre-defined.

There may be a plurality of pieces information about configurable threshold value sets and the threshold value set may be matched to each service. FIG. 5 illustrates an example, in which, when two sets, i.e., a set A and a set B are configurable, the base station sets the set A. According to an embodiment, it is obvious that the base station may configure the set B. i.e., the other threshold value set, later. In FIG. 5, the set A and set B may denote sets of IS and OOS threshold values for a specific service.

The base station may configure a time taken to measure the RLM-RS as another RLM/RLF factor. According to an embodiment, the base station may configure a number of consecutive IS or OOS indications as a factor related to the RLF. Due to the RLM in a physical layer, consecutive OOS may be occurred and transmitted to an RRC layer of the UE. The UE may operate an RLF timer when the OOS indications equal to or greater than a pre-defined number of consecutive OOS indications are received. When a timer is being operated, the UE may stop and reset the timer when a pre-defined number of consecutive IS indications is transmitted to the RRC layer of the UE.

A value of the RLF timer may be transmitted to the UE as the RLM/RLF factor.

In operation 1a-4, the UE may perform RLM and RLF after receiving the RLM/RLF factor.

In operation 1a-1-1, while performing the RLM and RLF, the UE may determine whether there is a factor reconfigured from the base station from among the above-described RLM/RLF factors. When there is a changed factor, in operation 1a-1-2, the UE may stop the RLM timer being reoperated and counting of the IS/OOS indications and reset the RLM timer and the IS/OOS indication counter.

In operation 1a-4, before reconfiguring occurs, the UE may monitor the RLM-RS and compare RLM-RS reception signal and an RLM threshold value for a window of a pre-determined time.

In operation 1a-5, based on a result of the comparing, the physical layer of the UE may generate the OOS indication when a strength of the RLM-RS reception signal is less than the OOS threshold value from among the configured RLM threshold values, and generate the IS indication and transmit the IS indication to the RRC layer when the strength of the RLM-RS reception signal is greater than the IS threshold value from among the configured RLM threshold values. During the comparing, when the threshold value is not a pure power-based value, such as RSRP, RSRQ, or RSSI, but is a target error rate, the strength of the reception signal and a value obtained by converting the threshold value to a pure power-based value corresponding to the target error rate are compared. Then, when the strength is less than the OOS indication, the OOS indication is transmitted to the RRC layer and when the strength is greater than the IS indication, the IS indication is transmitted to the RRC layer.

In operation 1a-6, the RRC layer may determine whether a received indication is the OOS indication.

In operation 1a-7, the RRC layer may determine whether a number of consecutive OOS indications reported up to now is equal to or greater than a pre-defined number of consecutive OOS indications.

In operation 1a-8, the UE may determine whether the RLF timer is being operated. When the RLF timer is not being operated, the UE may operate the RLF timer in operation 1a-9.

When the RLF timer is being operated, the UE may continue operations 1a-4, 1a-5, 1a-6, 1a-7, 1a-8, 1a-9, 1a-10, 1a-11-1, and 1a-11 until the RLF timer expires.

When the indication received by the RRC layer is not the OOS indication, the IS indication may have been received. In this case, in operation 1a-10, the UE may determine whether the RLF timer is being operated.

In operation 1a-11-1, the UE may determine whether a number of consecutive IS indications reported up to now is equal to or greater than a pre-defined number of IS indications.

When the number of consecutive IS indications is equal to or greater than the pre-defined number of IS indications, the UE may stop and reset the RLF timer, in operation 1a-11.

In operation 1a-2, the UE may determine whether the RLF timer expired. When the RLF timer expired, the UE may declare RLF in operation 1a-3. Here, the UE may determine a cause value to be timer expiry when the set A is used.

According to a provided set of RLM threshold values, a value of the window of time of operation 1a-4, the numbers of consecutive IS and OOS indications of operations 1a-7 and 1a-11-1, and a value of the RLF timer may vary. The serving base station may pre-transmit, to the UE, values of the above-described factors to be applied depending on each threshold value set. When a specific threshold value is configured to be used, the UE may use provided RLF/RLF factors corresponding to the specific threshold value.

Figure 6:
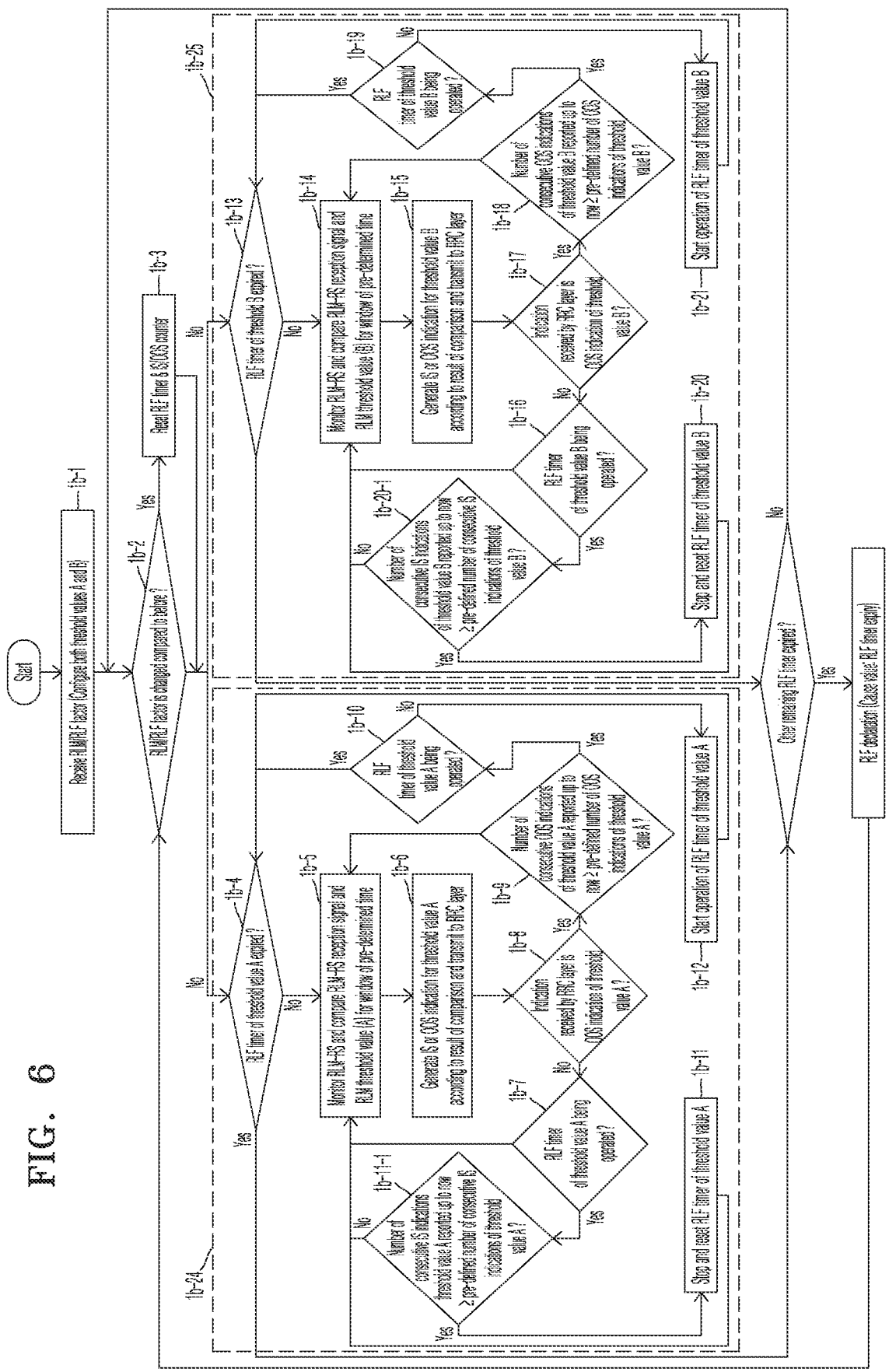
FIG. 6 is a diagram showing an RLF declaration operation of a UE, according to an embodiment.

FIG. 6 is a diagram showing an RLF declaration operation of a UE, according to an embodiment. In particular, FIG. 6 shows operations of the UE when the UE operates an RLF timer to which a plurality of RLM threshold values are applied simultaneously. Compared to the UE of FIG. 5, the UE of FIG. 6 may simultaneously perform RLMs to which the plurality of configured RLM threshold values are applied, at a specific time.

In operation 1b-1, the base station may transmit an RLM/RLF factor to the UE. As in the embodiment of FIG. 5, factors transmitted at this time may include a time of RLM-RS, a frequency location, an index of pre-defined RLM-RS, or an index of a pre-defined RLM-RS set.

Also, RLM threshold value information for comparing reception signals of RLM-RSs may be transmitted. The RLM threshold value may include values of RSRP, RSRQ, RSSI, target block error rate value, or an index indicating determined values of pre-defined metrics. When the value of RSRP, RSRQ, or RSSI is a threshold value, the UE may immediately compare a reception strength of RLM-RS and the threshold value. However, when the value of target error rate (e.g., target block error rate) is a threshold value, the UE may convert a strength of a reception signal corresponding to the target error rate into the threshold value for each UE and compare a measured reception strength of the RLM-RS and the converted value.

According to an embodiment, threshold values may be configured in a set and the set may include an IS threshold value and an OOS threshold value. According to characteristics of a provided service, the IS threshold value and the OOS threshold value for an A service may be configured and transmitted to the UE as one set. According to an embodiment, the IS and OOS threshold values may be separately present according to characteristics of each service. A serving base station may transmit, to the UE, an index indicating the set of IS and OOS threshold values while the IS and OOS threshold values for each service are pre-defined.

According to an embodiment, there may be a plurality of pieces information about threshold value sets and the threshold value set may be matched to each service. In FIG. 6, when two threshold value sets, i.e., a set A and a set B, are configurable, the base station may configure both the threshold value sets A and B to the UE and the UE independently performs RLM/RLF operations based on each threshold value set.

The base station may configure a time taken to measure the RLM-RS as another RLM/RLF factor to the UE. According to an embodiment, the base station may configure a number of consecutive IS or OOS indications as a factor related to the RLF. Due to the RLM in a physical layer, consecutive OOS may be occurred and transmitted to an RRC layer. The UE may operate an RLF timer when the OOS indications equal to or greater than a pre-defined number of consecutive OOS indications are received. When a timer is being operated, the UE may stop and reset the timer when a pre-defined number of consecutive IS indications is transmitted to the RRC layer.

A value of the RLF timer may be transmitted to the UE as the RLM/RLF factor. The UE may perform RLM and RLF after receiving the RLM/RLF factor. The above-described transmittable RLM/RLF factors may have different values for each threshold value set. The serving base station may configure such different values to the UE. In other words, the base station may configure, to the UE, at least one value from among RLM-RS configuration, RLM-RS monitoring time, RLF timer value, and a number of consecutive IS/OOS indications for each RLM threshold value set, and the UE may perform an RLM/RLF operation to which each factor is applied.

In operation 1b-2, the UE may determine whether the transmitted RLM/RLF factor is changed, i.e., reconfigured. When the RLM/RLF factor is changed, the UE may reconfigure a value of the RLF timer or IS/OOS counter, which has been maintained, to an initial configuration value, in operation 1b-3.

When the RLM/RLF factor is transmitted, the UE may independently perform the RLM/RLF operation for two sets. In FIG. 6, 1b-24 may be a flowchart indicating the RLM/RLF operation for the threshold value set A. 1b-25 may be a flowchart indicating the RLM/RLF operation for the threshold value set B.

In operations 1b-5 and 1b-14, the UE may monitor the RLM-RS. Also, the UE may compare a reception signal of RLM-RS with the RLM threshold value for a window of a pre-determined time.

In operations 1b-6 and 1b-15, a physical layer of the UE may generate the OOS indication when a strength of the reception signal is less than the OOS threshold value and generate the IS indication when the strength of the reception signal is greater than the IS threshold value. The UE may transmit, to the RRC layer of the UE, the generated indication.

In operations 1b-8 and 1b-17, the UE may determine whether the indication received by the RRC layer is the OOS indication. In operations 1b-9 and 1b-18, the UE may determine whether the number of consecutive OOS indications reported up to now is equal to or greater than the pre-defined number of consecutive OOS indications again. In operations 1b-10 and 1b-19, the UE may determine whether the RLF timer is currently operating. When the RLF timer is not operating, the UE may operate the RLF timer in operations 1b-12 and 1b-21. When the RLF timer is currently operating, the UE may continue operations 1b-5, 1b-6, 1b-8, 1b-9, 1b-10, 1b-12, 1b-7, 1b-11, and 1b-11-1 for the set A and operations 1b-14, 1b-15, 1b-17, 1b-18, 1b-19, 1b-21, 1b-16, 1b-20, and 1b-20-1 for the set B until the RLF timer expires.

When the indication received by the RRC layer is not the OOS indication, the IS indication may have been received. In operations 1b-7 and 1b-16, the UE may determine whether the RLF timer is operating. In operations 1b-1-1 and 1b-20-1, the UE may determine whether a number of consecutive IS indications reported up to now is equal to or greater than a pre-defined number of IS indications. When the number of consecutive IS indications is equal to or greater than the pre-defined number of IS indications, the UE may stop and reset the RLF timer, in operations 1b-11 and 1b-20.

In operations 1b-4 and 1b-13, the UE determines whether the RLF timer expired. In operation 1b-22, unlike the UE of FIG. 5, the UE of FIG. 6 determines whether the RLF timers of all threshold values other than the threshold value applied to the RLF timer currently expired are all expired. When the all RLF timers expired, the UE may declare RLF in operation 1b-23. Here, the UE may define an RLF cause value as RLF timer expiry.

Figure 7:
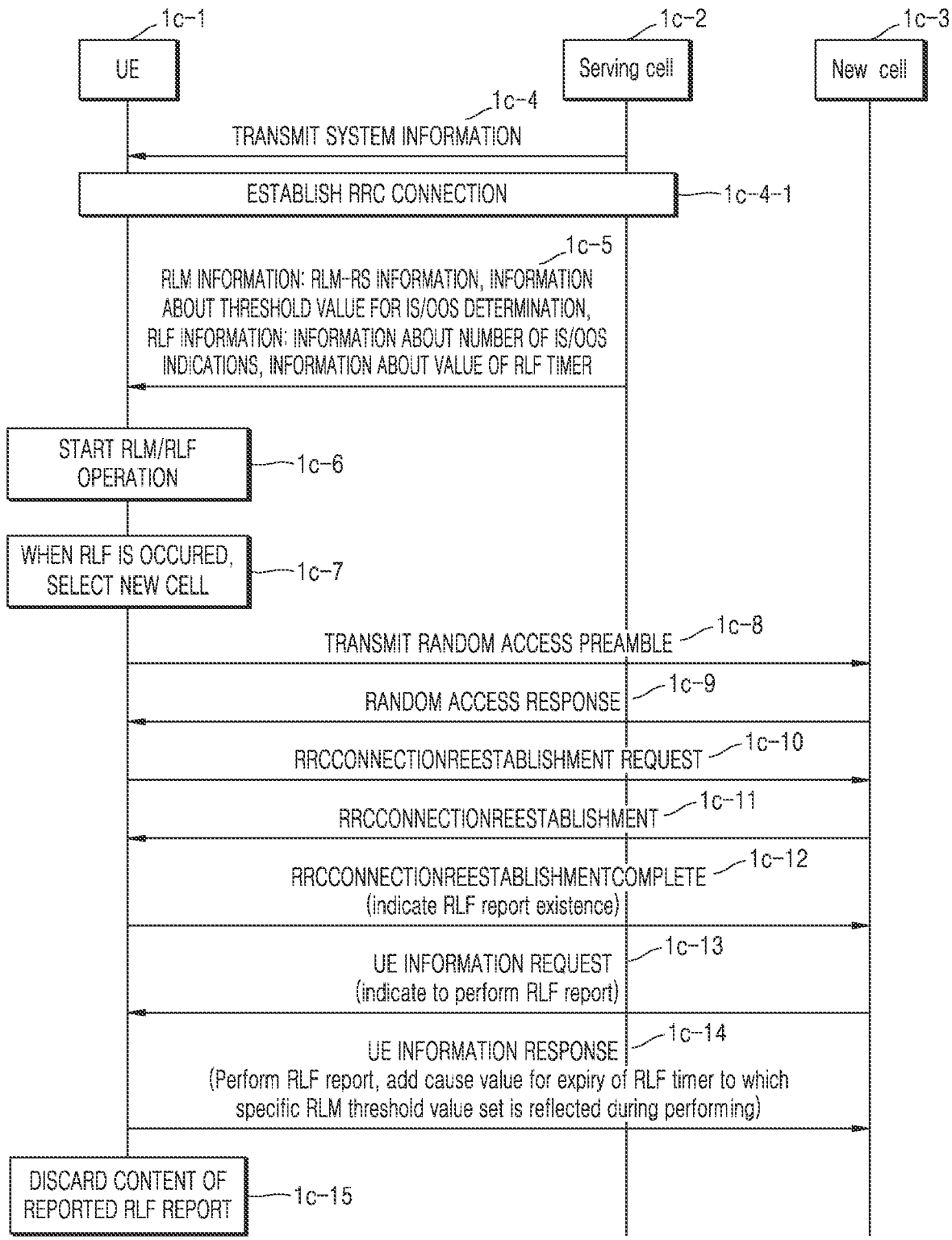
FIG. 7 is a diagram showing a process by which a UE transmits, to a new cell, a cause value in which a threshold value set is reflected as an RLF cause value, according to an embodiment.

FIG. 7 is a diagram showing a process by which a UE transmits, to a new cell, a cause value in which a threshold value set is reflected as an RLF cause value, according to an embodiment.

Referring to FIG. 7, in operation 1c-4, a UE 1c-1 may receive system information while maintaining a connection with a serving cell 1c-2.

Alternatively, in operation 1c-4-1, the UE 1c-1 may perform RRC connection establishment after receiving the system information. In this case, information related to RLM and RLF may be transmitted as the system information.

Alternatively, in operation 1c-5, the UE 1c-1 may receive RLM/RLF-related information via dedicated signaling after the connection. Here, as described with reference to FIG. 5, the RLM/RLF-related information may include a time of an RLM-RS, a frequency location, an index of a pre-defined RLM-RS, or an index of a pre-defined RLM-RS set. Also, the serving cell 1c-2 may configure a time taken to measure the RLM-RS or information about an RLM threshold value to be compared with a reception signal of the RLM-RS, and may transmit a number of consecutive IS or OOS indications and a value of an RLF timer to the UE 1c-1.

In operation 1c-6, upon receiving the RLM/RLF-related information, the UE 1c-1 may perform an RLM/RLF operation. Operation 1c-6 may be replaced by the operation described with reference to FIG. 5, 6, 8, or 9.

In operation 1c-7, when RLF corresponding to RLF timer expiry is declared while performing the RLM/RLF operation, the UE 1c-1 may select a cell again. When a new cell 1c-3 other than an existing cell is discovered, the UE 1c-1 may perform RRC connection reestablishment.

In operation 1c-7, when an RLF cause value is stored, the UE 1c-1 may store, as the RLF cause value, expiry of the RLF timer to which the RLM threshold value used to expire the RLF timer is reflected.

In operation 1c-8, to access the selected cell, the UE 1c-1 may transmit a random access preamble. In operation 1c-9, the UE 1c-1 may receive a random access response from the new cell 1c-3.

An RRCConnectionReestablishment message of operation 1c-11 and an RRCconnetionReestablishmentcomplete message of operation 1c-12 may be respectively replaced by an RRCConnectionSetup message and an RRCConnectionSetupComplete message, an RRCConnectionResume message and an RRCConnectionResumeComplete message, or an RRCConnectionReconfiguration message and an RRCConnectionReconfigurationComplete message.

Also, the RRCCoimectionReestablishment message of operation 1c-11 and the RRCconnetionReestablishmentcomplete message of operation 1c-12 may respectively correspond to an RRC connection-related reestablishment, setup, reconfiguration, or resume request message and a complete message thereof in the UE 1c-1, according to an NR type message name.

When an RLF cause value for a past RLF occurrence is stored in the UE 1c-1 at a time when the UE 1c-1 received, from the serving cell 1c-2, the RRCConnectionReestablishment message or a series of messages replacing the RRCConnectionReestablishment message, such as RRCConnectionSetup, RRCConnectionResume, or RRCConnectionReconfiguration message, the UE 1c-1 may transmit an indication that an RLF-related message or an RLF report is present while transmitting, to the serving cell 1c-2, the RRCConnectionReestablishmentComplete message or a series of message replacing the RRCConnectionReestablishmentComplete message.

The indication may be included in an RRCConnectionReestablishmentRequest message of operation 1c-10 or may be included in a replacement message corresponding thereto, i.e., in a ConnectionRequest, resumerequest, or reconfiguration request message.

When the serving cell 1c-2 receives a signal indicating that there is an RLF report from the UE 1c-1 in operation 1c-12, the serving cell 1c-2 may transmit a command to the UE 1c-1 to transmit the RLF report in operation 1c-13. A message used at this time may be a UE information request and an RRC message requesting the UE 1c-1 of a same role for information. Upon receiving the command, the UE 1c-1 may transmit, to the serving cell 1c-2, the RLF report together with a UE information response message, in operation 1c-14. A message transmitting the RLF report is not limited to the UE information response message and may be included in an arbitrary uplink message transmitting RRC information by the UE 1c-1.

Among content included in the RLF report of operation 1c-14, an RLF cause value may include RLF timer expiry when a threshold value for generating IS/OOS indication based on a reception signal strength measured via a pre-defined RLM-RS is considered. The UE 1c-1 may display information about the used threshold value for a timer expiry cause value. According to an embodiment, the UE 1c-1 may display the information about the threshold value as the cause value itself or by adding n bits as lower information of the cause value.

According to an embodiment, in addition to the RLF timer expiry, the RLF cause value may include a cause value for when maximum retransmissions are reached in an RLC layer. Here, the UE 1c-1 may distinguish, as the cause value, whether RLC maximum transmission is occurred in a duplicate bearer, in an RLC layer associated with a primary cell (Pcell), or in an RLC layer associated with a secondary cell (Scell). As described above, in this case as well, each case may be represented as the cause value itself or via n-bit indication as lower information of the same RLC maximum retransmission.

According to an embodiment, an ASN.1 structure below may be considered.

```
RLF-Report-r9 ::=            SEQUENCE {
    measResultLastServCell-r9      SEQUENCE {
        rsrpResult-r9                  RSRP-Range,
        rsrqResult-r9                  RSRQ-Range    OPTIONAL},
    [[ basicFields-r11             SEQUENCE {
        c-RNTI-r11                     C-RNTI,
        rlf-Cause-r11                  ENUMERATED { t310-Expiry-
thresholdA, t310-Expiry-thresholdB, randomAccessProblem, rlc-MaxNumRetx },
        timeSinceFailure-r11           TimeSinceFailure-r11
```

According to an embodiment, when threshold-A and threshold-B from among RLM threshold values are a configurable threshold value set, the cause value may be defined in a form of timer-expiry-(used threshold value). In addition to the method described in the current embodiment, any method enabling the serving cell 1c-2 to recognize the threshold value used by the UE 1c-1 may be defined as long as the method is combined with representation of the RLF timer expiry.

According to an embodiment, to indicate the information about the threshold value, separate n-bit representation may be used. As shown below, when there are two threshold values, the UE 1c-1 may add 1 bit of additional information to the RLF timer expiry. The serving cell 1c-2 determines which threshold value is used based on the addition information.

```
RLF-Report-r9 ::=            SEQUENCE {
    measResultLastServCell-r9      SEQUENCE {
        rsrpResult-r9                  RSRP-Range,
        rsrqResult-r9                  RSRQ-Range OPTIONAL},
    [[ basicFields-r11             SEQUENCE {
        c-RNTI-r11                     C-RNTI,
        rlf-Cause-r11                  ENUMERATED {t310-Expiry,
randomAccessProblem, rlc-MaxNumRetx },
        timeSinceFailure-r11
    t310-Expiry           ENUMERATED {thresholdA, thresholdB}
```

In operation 1c-15, after the transmission of the RLF report is completed, the UE 1c-1 may discard content of the RLF report that was stored. The UE 1c-1 may reduce usage time of an internal memory of the UE 1c-1 via the discarding.

Figure 8:
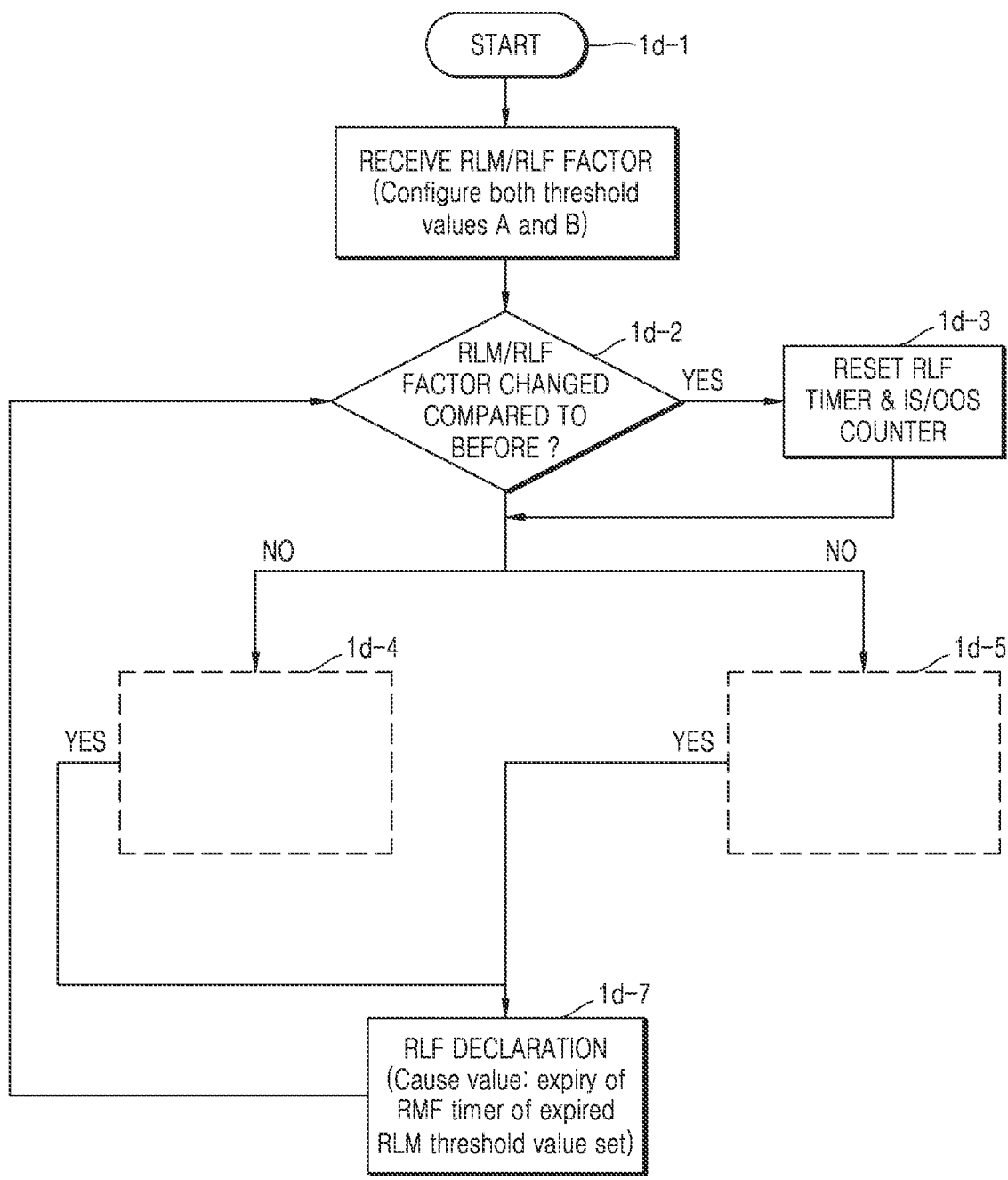
FIG. 8 is a diagram showing an RLF declaration operation of a UE, according to an embodiment.

FIG. 8 is a diagram showing an RLF declaration operation of a UE, according to an embodiment.

Referring to FIG. 8, when a plurality of RLM operations are performed in the UE and when an RLF timer to which any one of RLM threshold value sets is applied first expires, the UE may determine "expiry of the RLF timer to which the RLM threshold value set used in an expired timer" as an RLF cause value and declare RLF.

Operations 1d-4 and 1d-5 of FIG. 8 may be described with reference to operations 1b-24 and 1b-25 of FIG. 6, respectively. However, unlike the UE of FIG. 6, the UE of FIG. 8 may not compare a state of another RLF timer (operation 1b-22 of FIG. 6), but may reflect the RLM threshold value set applied to the first expired RLF timer as the RLF cause value.

Figure 9:
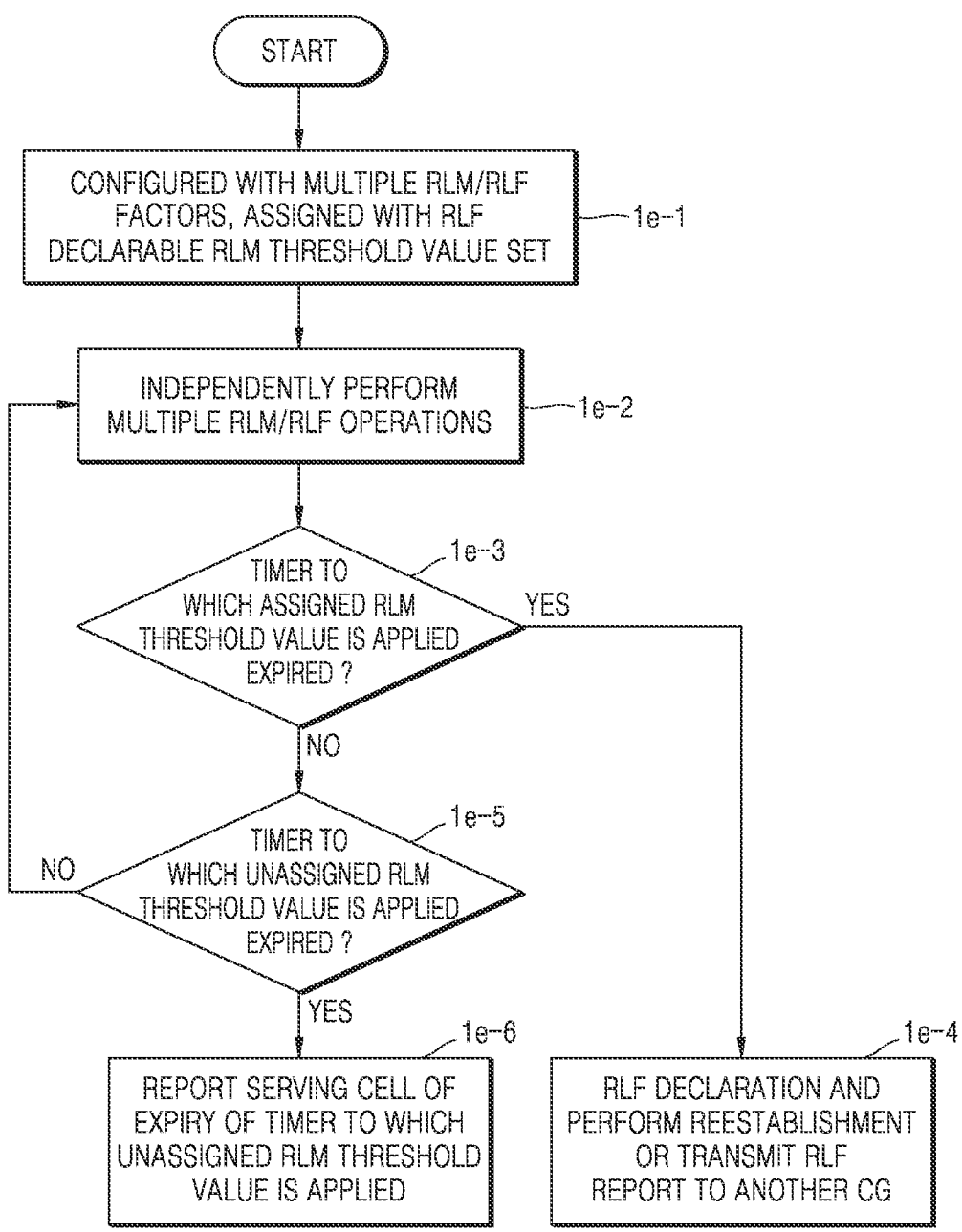
FIG. 9 is a diagram showing an RLF declaration operation of a UE, according to an embodiment.

FIG. 9 is a diagram showing an RLF declaration operation of a UE, according to an embodiment.

Referring to FIG. 9, multiple RLM threshold value sets are provided to the UE. When performing a plurality of RLM operations independently, the UE may consider only expiry of an RLF timer to which a specific RLM threshold value set is applied as a factor of RLF declaration. According to an embodiment, the specific threshold value set may include one of the followings.

1. The specific threshold value set may be a threshold value set corresponding to a lowest reception strength when a threshold value is converted into a reception strength value instead of a target error rate.

2. A serving base station may assign the specific threshold value set. In this case, expiry of an RLF timer operating based on a threshold value other than an assigned RLF declarable RLM threshold value set no longer affects the RLF declaration. Instead, the UE may indicate timer expiry to the serving base station, through an RRC message or MAC control element (CE), when the RLF timer operating based on an RLM threshold value set other than the assigned value expires.

In addition, in operation 1e-1, when the UE is configured with a plurality of RLM/RLF factors from the serving base station, the serving base station may assign an RLF declarable RLM threshold value set from among a plurality of RLM threshold values.

In operation 1e-2, the UE may independently perform RLM/RLF operations of the plurality of threshold values.

In operation 1e-3, the UE may determine whether a timer to which the assigned RLM threshold value is applied expired. When the timer expired, the UE may declare RLF and perform RRC reestablishment or transmit an RLF report to another cell group (CG), in operation 1e-4.

When the timer to which the assigned RLM threshold value is applied did not expire, the UE may determine whether a timer to which an unassigned RLM threshold value is applied expired in operation 1e-5. In operation 1e-6, the UE reports the serving cell of expiry of the timer to which the unassigned RLM threshold value is applied. In this case, as described above, the UE may report the expiry via an RRC message, an MAC CE, or uplink control information (UCI) of a physical layer.

Figure 10:
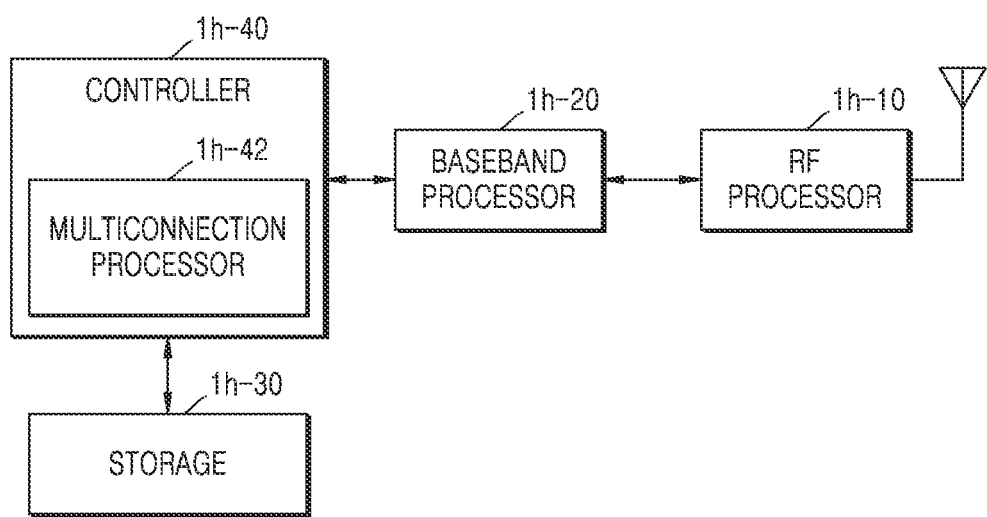
FIG. 10 is a block diagram of an internal structure of a UE, according to an embodiment.

FIG. 10 is a block diagram of an internal structure of a UE, according to an embodiment.

Referring to FIG. 10, the UE includes a radio frequency (RF) processor 1h-10, a baseband processor 1h-20, a storage 1h-30, and a controller 1h-40.

The RF processor 1h-10 may perform functions for transmitting and receiving signals through radio channels, e.g., signal band conversion and amplification. That is, the RF processor 1h-10 may up-convert a baseband signal provided from the baseband processor 1h-20, to an RF band signal and transmit the RF band signal through an antenna, and down-convert an RF band signal received through an antenna, to a baseband signal. For example, the RF processor 1h-10 may include at least one of a transmit filter, a receive filter, an amplifier, a mixer, an oscillator, a digital-to-analog converter (DAC), or an analog-to-digital converter (ADC). Only a single antenna is illustrated in FIG. 10, but this is only an example and the UE may include multiple antennas. The RF processor 1h-10 may include a plurality of RF chains. In addition, the RF processor 1h-10 may perform beamforming. For beamforming, the RF processor 1h-10 may adjust phases and amplitudes of signals transmitted or received through multiple antennas or antenna elements. The RF processor 1h-10 may perform a multiple-input multiple-output (MIMO) operation and may receive several layers while performing the MIMO operation.

The baseband processor 1h-20 may convert between a baseband signal and a bitstream based on physical layer specifications of a system. For example, for data transmission, the baseband processor 1h-20 may generate complex symbols by encoding and modulating a transmit bitstream. For data reception, the baseband processor 1h-20 reconstructs a received bitstream by demodulating and decoding a baseband signal provided from the RF processor 1h-10. For example, according to an OFDM scheme, for data transmission, the baseband processor 1h-20 may generate complex symbols by encoding and modulating a transmit bitstream, map the complex symbols to subcarriers, and then configure OFDM symbols by performing inverse fast Fourier transformation (IFFT) and cyclic prefix (CP) insertion. For data reception, the baseband processor 1h-20 may split a baseband signal provided from the RF processor 1h-10, in OFDM symbol units, reconstruct signals mapped to subcarriers by performing fast Fourier transform (FFT), and then reconstruct a received bitstream by demodulating and decoding the signals.

The baseband processor 1h-20 and the RF processor 1h-10 transmit and receive signals as described above. As such, each of the baseband processor 1h-20 and the RF processor 1h-10 may also be called a transmitter, a receiver, a transceiver, or a communicator. At least one of the baseband processor 1h-20 or the RF processor 1h-10 may include multiple communication modules to support multiple different radio access technologies. Also, at least one of the baseband processor 1h-20 or the RF processor 1h-10 may include multiple communication modules to process signals of different frequency bands. For example, the different radio access technologies may include wireless LAN (For example, IEEE 802.11), a cellular network (for example, LTE), and the like. The different frequency bands may include a super high frequency (SHF) (e.g., 2.5 GHz and 5 GHz) band or a mmWave (e.g., 60 GHz) band.

The storage 1h-30 may store data for operation of the base station described above, e.g., basic programs, application programs, and configuration information. The storage 1h-30 may provide the stored data upon request by the controller 1h-40.

The controller 1h-40 may control overall operations of the UE. For example, the controller 1h-40 may transmit and receive signals through the baseband processor 1h-20 and the RF processor 1h-10. The controller 1h-40 may record and read data on and from the storage 1h-30. In this regard, the controller 1h-40 may include at least one processor. For example, the controller 1h-40 may include a communication processor (CP) for controlling communications and an application processor (AP) for controlling an upper layer such as an application program.

Figure 11:
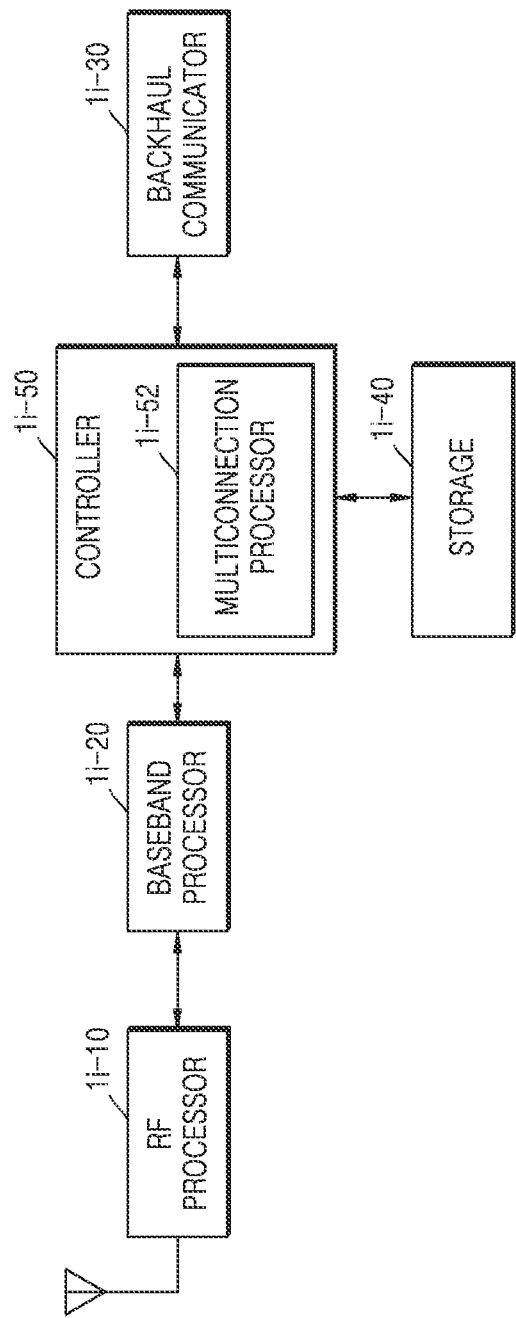
FIG. 11 is a block diagram of a configuration of a base station, according to an embodiment.

FIG. 11 is a block diagram of a configuration of a base station, according to an embodiment.

As shown in FIG. 11, the base station may include an RF processor 1i-10, a baseband processor 1i-20, a backhaul communicator 1i-30, a storage 1i-40, and a controller 1i-50.

The RF processor 1i-10 may perform functions for transmitting and receiving signals through radio channels, e.g., signal band conversion and amplification. That is, the RF processor 1i-10 up-converts a baseband signal provided from the baseband processor 1i-20, to an RF band signal and transmit the RF band signal through an antenna, and down-converts an RF band signal received through an antenna, to a baseband signal. For example, the RF processor 1i-10 may include at least one of a transmit filter, a receive filter, an amplifier, a mixer, an oscillator, a DAC, or an ADC. Only a single antenna is illustrated in FIG. 11, but an embodiment is not limited thereto and the base station may include a plurality of antennas. The RF processor 1i-10 may include a plurality of RF chains. In addition, the RF processor 1i-10 may perform beamforming. For beamforming, the RF processor 1i-10 may adjust phases and amplitudes of signals transmitted or received through a plurality of antennas or antenna elements. The RF processor 1i-10 may perform a downlink MIMO operation by transmitting at least one layer.

The baseband processor 1i-20 may convert between a baseband signal and a bitstream based on physical layer specifications. For example, for data transmission, the baseband processor 1i-20 generates complex symbols by encoding and modulating a transmit bitstream. For data reception, the baseband processor 1i-20 reconstructs a received bitstream by demodulating and decoding a baseband signal provided from the RF processor 1i-10. For example, according to an OFDM scheme, for data transmission, the baseband processor 1i-20 generates complex symbols by encoding and modulating a transmit bitstream, maps the complex symbols to subcarriers, and then configures OFDM symbols by performing IFFT and CP insertion. For data reception, the baseband processor 1i-20 may split a baseband signal provided from the RF processor 1i-10, in OFDM symbol units, reconstruct signals mapped to subcarriers by performing FFT, and then reconstruct a received bitstream by demodulating and decoding the signals. The baseband processor 1i-20 and the RF processor 1i-10 may transmit and receive signals as described above. As such, each of the baseband processor 1i-20 and the RF processor 1i-10 may also be called a transmitter, a receiver, a transceiver, a communicator, or a wireless communicator.

The backhaul communicator 1i-30 may provide an interface for communicating with other nodes in a network. In other words, the backhaul communicator 1i-30 may convert a bit string transmitted from a main base station to another node, for example, an auxiliary base station or a core network, into a physical signal, and convert a physical signal received from the other node into a bit string.

The storage 1i-40 may store data for operation of the main base station described above, e.g., basic programs, application programs, and configuration information. In particular, the storage 1i-40 may store information about bearers allocated for a connected UE, a measurement report transmitted from the connected UE, etc. The storage 1i-40 may store criteria information used to determine whether to provide or release multi-connectivity to or from the UE. The storage 1*i*-40 may provide the stored data upon request by the controller 1*i*-50.

The controller 1*i*-50 may control overall operations of the main base station. For example, the controller 1*i*-50 may transmit and receive signals through the baseband processor 1*i*-20 and the RF processor 1*i*-10 or through the backhaul communicator 1*i*-30. The controller 1*i*-50 may record and read data on and from the storage 1*i*-40. In this regard, the controller 1*i*-50 may include at least one processor.

Figure 12:
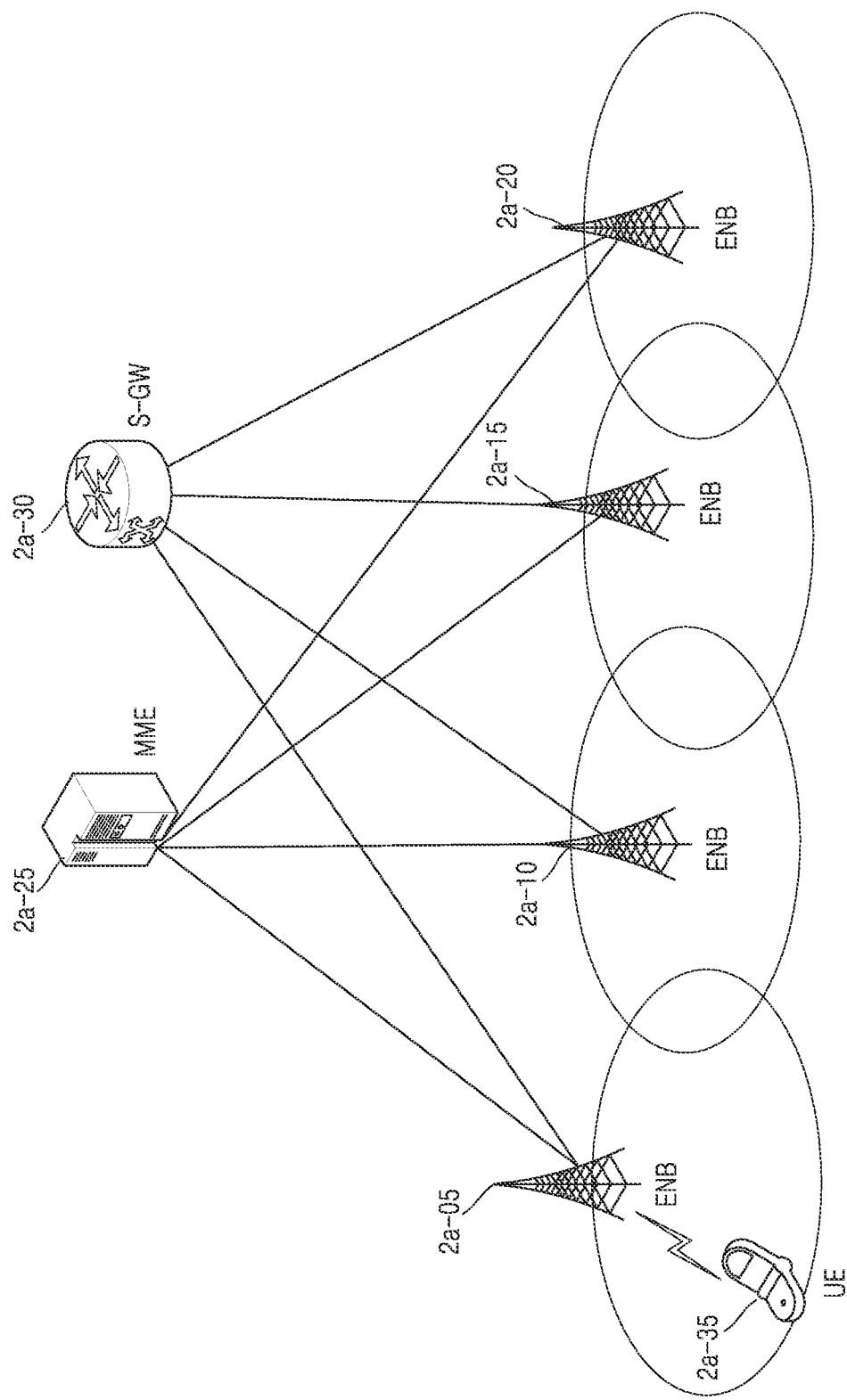
FIG. 12 is a diagram of a structure of an LTE system, according to an embodiment.

FIG. 12 is a diagram of a structure of an LTE system, according to an embodiment. The current embodiment may also be applied to an NR system.

Referring to FIG. 12, a wireless communication system may include a plurality of base stations (eNBs) 2*a*-5 through 2*a*-20, an MME 2*a*-25, and an S-GW 2*a*-30. A UE or a terminal 2*a*-35 may access an external network via the base station 2*a*-05, 2*a*-10, 2*a*-15, or 2*a*-20 and the S-GW 2*a*-30.

The base stations 2*a*-5 through 2*a*-20 are access nodes of a cellular network and may provide wireless access to UEs accessing a network. In other words, the base stations 2*a*-5 through 2*a*-20 may collect status information, such as buffer statuses of UEs, available transmission power statuses, and channel statuses, and perform scheduling to service traffic of users, thereby supporting connections between UEs and a core network (CN). The MME 2*a*-25 is an entity for performing various control functions including a mobility management function for the UE and is connected to multiple base stations. The S-GW 2*a*-30 is an entity for providing a data bearer. Also, the MME 2*a*-25 and the S-GW 2*a*-30 may perform authentication and bearer management on a UE accessing a network, and may process a packet arrived from the base station 2*a*-05, 2*a*-10, 2*a*-15, or 2*a*-20 or a packet to be transmitted to the base station 2*a*-05, 2*a*-10, 2*a*-15, or 2*a*-20.

Figure 13:
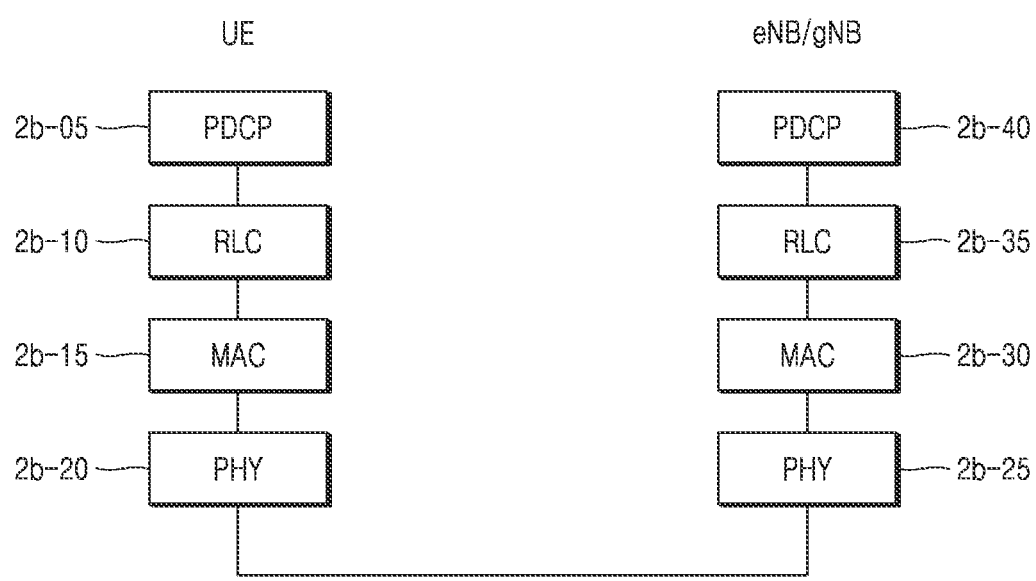
FIG. 13 is a diagram of a radio protocol architecture in an LTE or new radio (NR) system, according to an embodiment.

FIG. 13 is a diagram of a radio protocol architecture in an LTE or NR system, according to an embodiment. Referring to FIG. 13, the radio protocol architecture of the LTE system may include PDCP layers 2*b*-05 and 2*b*-40, RLC layers 2*b*-10 and 2*b*-35, and MAC layers 2*b*-15 and 2*b*-30 respectively for a UE and an eNB. The PDCP layer 2*b*-05 or 2*b*-40 may perform operations such as IP header compression/reconstruction, and the RLC layer 2*b*-10 or 2*b*-35 may reconfigure a PDCP PDU in an appropriate size. The MAC layer 2*b*-15 or 2*b*-30 is connected to multiple RLC layers configured for a single UE and may multiplex RLC PDUs into a MAC PDU and demultiplex the RLC PDUs from the MAC PDU. A physical layer 2*b*-20 or 2*b*-25 may channel-code and modulate upper layer data into OFDM symbols and transmit the OFDM symbols through a radio channel, or demodulate OFDM symbols received through a radio channel and channel-decode and deliver the OFDM symbols to an upper layer. A physical layer may also use HARQ for additional error correction, and a reception end may transmit information about reception of a packet transmitted from a transmission end in one bit. This is referred to as HARQ ACK/NACK information.

Downlink HARQ ACK/NACK information for uplink data transmission may be transmitted via a physical HARQ indicator channel (PHICH) in case of LTE. In case of NR, a physical dedicated control channel (PDCCH), i.e., a channel through which downlink/uplink resource assignment is transmitted, may determine whether retransmission is required or new transmission is to be performed via scheduling information of a corresponding UE. This is because asynchronous HARQ is applied for NR. Uplink HARQ ACK/NACK information for downlink data transmission may be transmitted through a physical uplink control channel (PUCCH) or a physical uplink shared channel (PUSCH). The PUCCH is generally transmitted in an uplink of a Pcell described later, but when supported by a UE, the PUCCH may be additionally transmitted to the UE via an Scell described later and may be referred to as a PUCCH Scell.

Although not illustrated, an RRC layer is present in each of upper layers of PDCP layers of the UE and the base station, and access and measurement-related configuration control messages for radio resource control may be exchanged via the RRC layer.

The physical layer may include one or a plurality of frequencies/carriers, and a technology for simultaneously configuring and using the plurality of frequencies is referred to as a carrier aggregation (CA) technology. According to the CA technology, a transmission amount may be dramatically increased by a number of subcarriers, by using a main carrier and one or a plurality of additional subcarriers instead of one carrier, for communication between a terminal (or UE) and a base station (E-UTRAN NB or eNB). In LTE, a cell in the base station using a main carrier is referred to as a Pcell, and a cell in the base station using a subcarrier is referred to as an Scell.

FIG. 14 is a diagram for describing downlink and uplink channel frame structures when an NR system performs beam-based communication, according to an embodiment.

Referring to FIG. 14, a base station 2*c*-01 may transmit a signal in a form of beams 2*c*-11 through 2*c*-17 to transmit a wider coverage or stronger signal. Accordingly, a UE 2*c*-03 within a cell may need to transmit or receive data by using a specific beam transmitted by a base station. In FIG. 14, the beam #1 2*c*-13 is used as an example.

Depending on whether a UE is connected to a base station, a state of the UE may be divided into an idle mode (RRC_IDLE) and a connection mode (RRC_CONNECTED). The base station is unable to determine a location of the UE in the idle mode.

When the UE in the idle mode is to transit to the connection mode, the UE may receive synchronization signal blocks (SSBs) 2*c*-21 through 2*c*-27 transmitted by the baser station. An SSB is an SSB signal periodically transmitted according to a period set by the base station, and each SSB may be divided into a primary synchronization signal (PSS) 2*c*-41, a secondary synchronization signal (SSS) 2*c*-43, and a physical broadcast channel (PBCH) 2*c*-45.

In FIG. 14, a scenario in which an SSB is transmitted for each beam will be described. However, the present disclosure is not limited thereto and other various scenarios may be applied.

For example, a case in which the SSB #0 2*c*-21 is transmitted by using the beam #0 2*c*-11, the SSB #1 2*c*-23 is transmitted by using the beam #1 2*c*-13, the SSB #2 2*c*-25 is transmitted by using the beam #2 2*c*-15, and the SSB #3 2*c*-27 is transmitted by using the beam #3 2*c*-17 is assumed. Also, for example, it is assumed that the UE in the idle mode is located in the beam #1 2*c*-13 and accordingly, the UE receives the SSB #1 2*c*-23 transmitted via the beam #1 2*c*-13.

Upon receiving the SSB #1, the UE may obtain a physical cell identifier (PCI) of the base station via PSS and SSS, and upon receiving the PBCH, the UE may determine not only an identifier of a currently received SSB (i.e., #1) and a location of the current SSB in a 10 ms frame, but also a system frame number (SFN) in an SFN having a period of 10.24 seconds.

Also, the PBCH may include a master information block (MIB) and the MIB may indicate at which location system information block type 1 (SIB1) broadcasting detailed configuration information of a cell is received. Upon receiving the SIB1, the UE may determine a total number of SSBs transmitted by the base station and determine a location of a physical random access channel (PRACH) occasion, where random access is performable to transit to the connection mode, more particularly, where a preamble, i.e., a physical signal specially designed for uplink synchronization, is transmittable. In FIG. 14, PRACH occasions 2c-30 through 2c-39 are assumed to be scenarios assigned for each 1 ms.

In addition, based on the above-described information, the UE may determine which PRACH occasion from among the PRACH occasions is mapped to which SSB index. For example, in FIG. 14, a scenario in which a PRACH occasion is assigned for each 1 ms is assumed and a scenario in which 1/2 SSB is assigned for each PRACH occasion (i.e., two PRACH occasions for each SSB) is assumed. Accordingly, FIG. 14 illustrates a scenario in which two PRACH occasions are assigned for each SSB from a start of the PRACH occasion starting according to an SFN.

In other words, for example, the PRACH occasions 2c-30 and 2c-31 are assigned for SSB #0 and the PRACH occasions 2c-32 and 2c-33 are assigned for each SSB #1. After configuring the PRACH occasions for all SSBs, the PRACH occasions 2c-38 and 2c-39 may be assigned again for the first SSB.

Accordingly, the UE may identify the locations of the PRACH occasions 2c-32 and 2c-33 for SSB #1 and transmit a random access preamble via a fastest PRACH occasion (for example, the PRACH occasion 2c-32) at a current time point from among the PRACH occasions 2c-32 and 2c-33 corresponding to SSB #1. Because the preamble is received from the PRACH occasion 2c-32, the base station may determine that the UE selected SSB #1 to transmit the preamble, and accordingly, transmit or receive data via the corresponding beam while performing subsequent random access.

Figure 15:
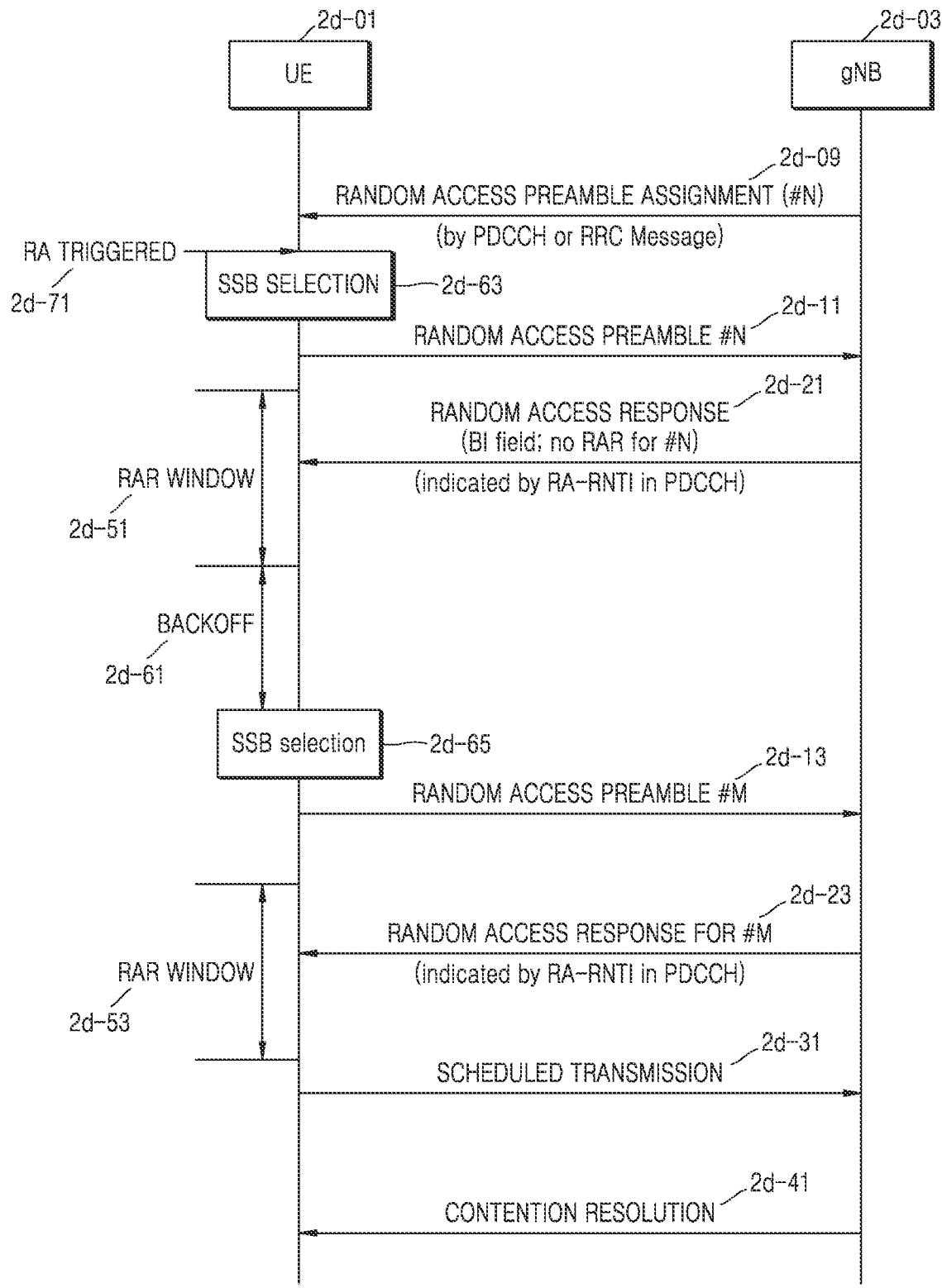
FIG. 15 is a diagram for describing a method by which a UE performs random access to a base station (next-generation node B (gNB)), according to an embodiment.

FIG. 15 is a diagram for describing a method by which a UE performs random access to a base station (gNB), according to an embodiment. In particular, FIG. 15 is a diagram showing a contention-based random access procedure performed by the UE. A contention-based random access may be performed in various cases where an initial access, a re-access, handover, and other random accesses are required.

In FIG. 15, the contention-based random access procedure is mainly described. On the other hand, in a non-contention random access procedure, to enable a UE 2d-01 to perform a non-contention-based random access by a base station 2d-03, a procedure of assigning a dedicated random access resource in operation 2d-09 may be present before random access. The dedicated random access resource may be a specific preamble index and/or a PRACH resource on a specific time/frequency. Also, the base station 2d-03 may assign information about the dedicated random access resource via PDCCH or transmit a message of an RRC layer. The message of the RRC layer may include a message such as RRCReconfiguration. When there is a dedicated random access resource assigned from a base station with respect to a random access procedure currently performed by a UE, the UE may transmit a random access preamble via the dedicated random access resource. Also, regarding a non-contention-based random access, when there is a preamble transmitted by a UE in a re-authorization request (RAR) message, it is determined that the random access is successfully completed and a random access procedure may be ended.

Hereinafter, the contention-based random access procedure will be described.

First, in operation 2d-71, the UE 2d-01 may trigger a random access for an access to the base station 2d-03.

When the random access is triggered, the UE 2d-01 may first determine a beam through which transmission and reception of data including a random access are to be performed as described with reference to FIG. 14, and select an SSB accordingly, in operation 2d-63.

As a method of selecting an SSB, according to an embodiment, there is a method by which the base station 2d-03 transmits a certain threshold value to SIB1 described above and the UE 2d-0 selects one of SSBs of which signal strengths exceed the threshold value. For example, in FIG. 14, when the UE 2d-01 received all of SSB #0, SSB #1, and SSB #2, but only a signal strength of the SSB #1 exceeded the threshold value and signal strengths of the SSB #0 and SSB #2 did not exceed the threshold value, the UE 2d-01 may select the SS B #1. The threshold value may be directly configured to the SIB1 or UE via the message of the RRC layer and the base station 2d-03 may instruct a value of RSRP of SSB or RSRP of channel state information reference signal (CSI-RS), such as rsrp-ThresholdSSB or rsrp-ThresholdCSI-RS.

When the SSB is selected, a PRACH occasion mapped to the selected SSB may be determined. Accordingly, in operation 2d-11, the UE 2d-01 may transmit a random access preamble to the base station 2d-03 via the PRACH occasion.

One or more UEs may transmit the random access preamble simultaneously via the PRACH occasion. A PRACH resource may span one frame or only some symbols in one frame may be used. Information about the PRACH resource is included in system information broadcasted by the base station 2d-03 and accordingly, the UE 2d-01 may identify via which time frequency resource the preamble is to be transmitted. Also, the random access preamble is a specific sequence specially designed to be receivable even when transmitted before being completely synchronized with the base station 2d-03, and may include a plurality of preamble indexes according to the standard. When there are the plurality of preamble indexes, a preamble transmitted by the UE 2d-01 may be randomly selected by the UE 2d-01 or may be a specific preamble assigned by the base station 2d-03.

Meanwhile, regarding a process of selecting the SSB, when the UE already in the connection mode performs the random access and the base station 2d-03 set a specific signal to be measured, the PRACH occasion may be selected based on the specific signal to be measured instead of the SSB. The specific signal to be measured may include the SSB or CSI-RS. For example, when handover to another base station is performed due to movement of the UE or the like, a PRACH occasion mapped to SSB or CSI-RS of a target base station of a handover command may be selected, and accordingly, the UE may measure the set signal and determine via which PRACH occasion the random access preamble is to be transmitted.

When the base station 2d-03 received the above-described preamble (or a preamble transmitted by another UE), the base station 2d-03 may transmit, to the UE 2d-01, a random access response (RAR) message in response, in operation 2d-21. The RAR message may include at least one of index information of the preamble used in operation 2d-11, uplink transmission timing correction information, uplink resource assignment information to be used in a next operation (i.e., operation 2d-31), or temporary UE identifier information.

The index information of the preamble may be transmitted to, for example, indicate which preamble response message is the RAR message when a plurality of UEs attempt random access by transmitting different preambles in operation 2d-11. The uplink resource assignment information is detailed information of a resource to be used by the UE 2d-01 in operation 2d-31, and may include a physical location and size of a resource, a modulation and coding scheme (MCS) used during transmission, and power adjustment information during transmission. The temporary UE identifier information is a value transmitted to be used because the UE 2d-01 does not possess an identifier assigned by the base station 2d-03 for communication with the base station 2d-03 when the UE 2d-01 that transmitted the preamble performs initial access.

Also, when the base station 2d-03 determines that there are too many UEs performing random access based on an energy amount of received PRACH or because it is determined that the number of preambles received via the PRACH for a certain period of time is equal to or greater than a certain number, the base station 2d-03 may transmit a subheader in which backoff indicator information is included in the RAR message. The subheader may be located at the first part of the RAR message. A backoff indicator has an amount of 4 bits and may have a value according to Table 1 below.

TABLE 1

| Index | Backoff Parameter value (ms) |
|---|---|
| 0 | 5 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | 1920 |
| 14 | Reserved |
| 15 | Reserved |

When the UE 2d-01 did not receive a response to the preamble transmitted within a period 2d-51 that is an "RAR window" period and only received the backoff indicator information, the UE 2d-01 may select any number between 0 and the value received during the preamble retransmission and delay a preamble retransmission time by a time of the selected value in operation 2d-61.

The RAR message needs to be transmitted within a certain period starting from a certain time after the preamble is transmitted, and such a certain period is called an RAR window 2d-51 or 2d-53. The RAR window may start from a point when a certain time is passed after the first preamble is transmitted. The certain time may have a value of a subframe unit (2 ms) or less. Also, a length of the RAR window may be a certain value configured by the base station 2d-03 for each PRACH resource or for each PRACH resource set in a system information message broadcasted by the base station 2d-03.

When the RAR message is transmitted, the base station 2d-03 may schedule the RAR message via PDCCH and scheduling information may be scrambled by using a random access-radio network temporary identifier (RA-RNTI).

The RA-RNTI may be mapped to the PRACH resource used to transmit the message used in operation 2d-11, and upon transmitting the preamble via a specific PRACH resource, the UE 2d-01 may determine whether there is a corresponding RAR message by attempting PDCCH reception based on the RA-RNTI. In other words, when the RAR message is a response to the preamble transmitted by the U in operation 2d-11 as in FIG. 15, the RA-RNTI used for the scheduling information of the RAR message may include information about the transmission of operation 2d-11. The RA-RNTI may be calculated according to Equation 1 below.

$$\text{RA-RNTI} = 1 + s\_id + 14 \times t\_id + 14 \times 80 \times f\_id + 14 \times 80 \times 8 \times ul\_carrier\_id \qquad \text{Equation 1}$$

Here, s_id denotes an index corresponding to a first OFDM symbol where transmission of the preamble transmitted in operation 2d-11 starts, and 0=s_id<14 (i.e., the maximum OFDM number in one slot). Also, t_id denotes an index corresponding to a first slot where transmission of the preamble transmitted in operation 2d-11 starts, and 0=t_id<80 (i.e., the maximum slot number in one system frame (20 ms)). Also, f_id denotes which PRACH resource the preamble transmitted in operation 2d-11 is transmitted on a frequency, and 0=f_id<8 (i.e., the maximum PRACH number on a frequency within a same time). In addition, ul_carrier_id may be a factor for distinguishing whether the preamble is transmitted via normal uplink (NUL) (in this case, 0) or via supplementary uplink (SUL) (in this case, 1), when two carriers are used as uplink for one cell.

In FIG. 15, a scenario in which the UE 2d-01 received the RAR message via RA-RNTI corresponding to the preamble transmission of operation 2d-11 but the index corresponding to the preamble is not included is assumed. In other words, for example, the UE 2d-01 may have transmitted a seventh preamble among total 64 preamble indexes, but an RAR message received from the base station 2d-03 may include only a response to a fourth preamble. Accordingly, when there is a backoff indicator (BI) value received during the preamble retransmission, the UE 2d-01 may select the SSB again at a corresponding time in operation 2d-65 to retransmit the preamble after a time delayed by a value randomly selected from the BI value. The UE 2d-01 may retransmit the preamble via the corresponding PRACH occasion according to the selected SSB in operation 2d-13, stand by for a response for the RAR window 2d-53 and receive the response in operation 2d-23. Accordingly, when there were many UEs performing random access, the preamble transmission is distributed on time and thus a probability of random access success is increased.

Moreover, when the UE 2d-01 retransmits the preamble in operation 2d-13, the UE 2d-01 may retransmit the preamble in power (power ramping) obtained by increasing transmit power of transmitting the preamble compared to the preamble that was transmitted in operation 2d-11 only by a value (preamblePowerRampingStep) configured by the base station 2d-03. Accordingly, as the number of retransmissions increases, the power continuously increases until the maximum transmit power of the UE 2d-01 is reached and a probability of a signal reaching the base station 2d-03 may be further increased.

Upon receiving the RAR message for the transmitted preamble, the UE 2d-01 may transmit another message depending on various purposes described above via the resource assigned to the RAR message, in operation 2d-31. The message described above is a message transmitted third in FIG. 15 and is also referred to as message 3 (msg3) (i.e., the preambles in operation 2d-11 or 2d-13 is also referred to as msg1 and the RAR message in operation 2d-21 is also referred to as msg2).

According to an embodiment, the UE 2d-01 may transmit, as the msg3, the message of RRC layer, i.e., the RRCConnectionRequest message, during initial access, the RRCConnectionReestablishmentRequest message during re-access, and the RRCConnectionReconfigurationComplete message during handover. Alternatively, the UE 2d-01 may transmit a buffer status report (BSR) message for a resource request.

Next, the UE 2d-01 may receive, from the base station 2d-03, a contention resolution message in operation 2d-41 during initial transmission (i.e., when the msg3 does not include base station identifier information pre-assigned by the UE). The contention resolution message includes the content transmitted by the UE via the msg3, and thus even when there are a plurality of UEs that selected the same preamble in operation 2d-11 or 2d-13, the base station 2d-03 may identify which UE the response is for.

Reasons of the UEs performing random access may be different for each UE. As described above, the reasons may vary, such as initial access (including initial access for traffic of high priority), handover, reestablishment due to RRC layer connection failure, and in addition, the random access may also be used when beam failure, in which transmission fails because a direction of a transmission beam does not match a direction of the UE in a system using a high frequency, is recovered. During the handover and recovery of the beam failure, the random access may be required to be performed faster. This is to minimize user's inconvenience because the UE is disconnected during communication.

Accordingly, when the random access is performed for the handover or the recovery of beam failure, a backoff indicator and a power ramping value may be different from those during general random access. For example, the backoff indicator may use a shorter value and the power ramping value may use a greater value for the corresponding purpose, thereby increasing a success probability and reducing a success time of the random access. As such, a parameter for assigning a high priority is collectively referred to as a high priority access (HPA) parameter.

During the recovery of beam failure, the UE may perform the corresponding operation not only in a Pcell but also in an Scell, and accordingly, the HPA parameter may be commonly signaled and applied to all serving cells. In addition, the base station may separately configure general random access parameters (a size of RAR window, a size of power ramping, or a maximum number of preamble transmissions) for each serving cell.

Figure 16:
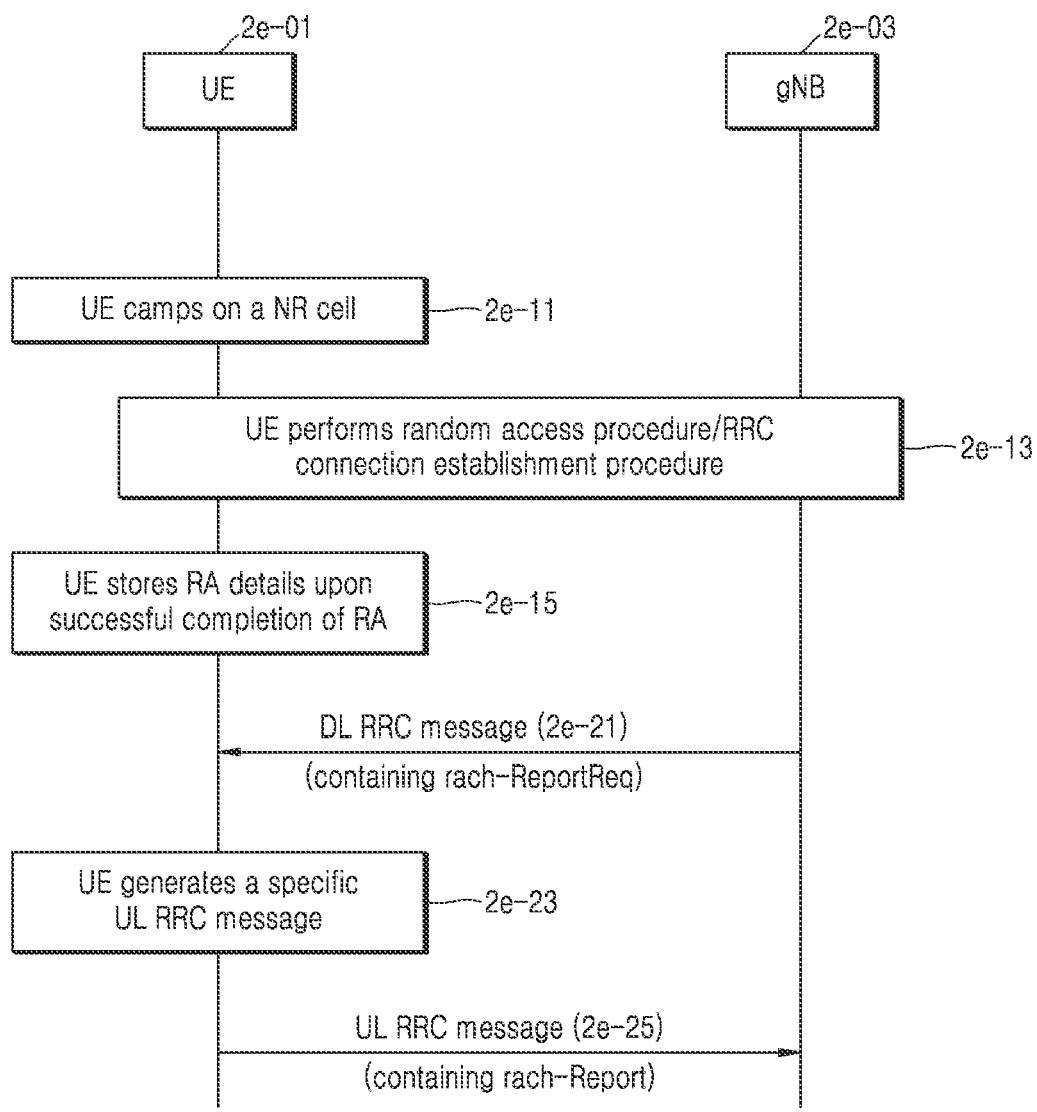
FIG. 16 is a diagram for describing a method by which a UE reports previous random access-related information to a base station, according to an embodiment.

FIG. 16 is a diagram for describing a procedure by which a UE reports previous random access-related information to a base station, according to an embodiment.

Referring to FIG. 16, in operation 2e-11, it is assumed that a UE 2e-01 is in an idle mode and is camped to an NR base station. Here, being camped may denote a state in which the UE 2e-01 selected one neighboring base station and staying there.

Then, in operation 2e-13, the UE 2e-01 may perform a random access procedure for connection establishment to a base station 2e-03 due to transition to a connection mode for uplink data transmission or the like. Accordingly, the UE 2e-01 may perform random access via the procedure described above and transmit an msg3 by adding an RRC connection request message to the msg3 to establish connection to the current base station and transit to the connection mode.

When the random access procedure is successfully completed, the UE 2e-01 may store at least one piece of information below generated during the random access procedure in operation 2e-15.

- A total number of times a random access preamble is transmitted: When the random access procedure is not successful at one time and preamble retransmission occurs, the total number of preamble transmissions needs to be determined.
- A number of times a non-contention-based random access preamble is transmitted: When the non-contention-based random access preamble is assigned, the UE may perform non-contention-based or contention-based random access according to a selected SSB during preamble transmission during the total preamble transmission, and accordingly, the total number of times the random access preamble is transmitted and the number of times the non-contention-based random access preamble is transmitted may be different.
- A number of times a contention-based random access preamble is transmitted: When the non-contention-based random access preamble is assigned, the UE may perform non-contention-based or contention-based random access according to a selected SSB during preamble transmission during the total preamble transmission, and accordingly, the total number of times the random access preamble is transmitted and the number of times the contention-based random access preamble is transmitted may be different.
- A number of changes between non-contention-based random access and contention-based random access: Described as above.
- A number of power rampings: In NR, power is not increased when an SSB selected during preamble retransmission is changed and the base station needs to identify how many times such cases occurred.
- A number of RAR reception failures: It is required to identify how many RARs are not received within an RAR window during the random access procedure.
- A list of SSBs/CSI-RSs selected by the UE to perform the random access (or a list of SSBs/CSI-RSs selected but unsuccessful in random access) and a number of selections for each SSB/CSI-RS: The number of selections for each SSB may be determined to be used for detailed configuration adjustment regarding a beam determined to have a corresponding problem.
- A list or number of SSBs or CSI-RSs that exceeded the above-described threshold value (i.e., rarsp-ThresholdSSB or rsrp-ThrehsoldCSI-RS) during last successful random access preamble transmission: Through the list or number, a width of beam or the like may be adjusted.
- A number of times preamble transmission failed: When the random access is performed in an unlicensed band, a time for standing by until a channel is vacant because the channel is occupied by another device and thus a preamble is unable to be transmitted from a fastest PRACH occasion needs to be identified (Using this, an operation of moving to an operation frequency to another unlicensed band may be performed).

In operation 2e-21, the base station 2e-03 may determine that the UE 2e-01 is able to report information stored during previous successful random access according to capability of the UE 2e-01 that reported during initial access, and request the UE 2e-01 to report the information. As the request, a message of a certain downlink RRC layer may be used and the base station 2e-03 may request the UE 2e-01 to report the information by adding a parameter, such as rach-ReportRequest, to the message.

Upon receiving the request, the UE 2e-01 may generate a message including the stored information in operation 2e-23. The UE may transmit the generated message to the base station 2e-03 in operation 2e-25. Accordingly, the base station 2e-03 is reported about a detailed situation about the previous successful random access of the UE 2e-01 and thereby adjust a random access channel within a cell or adjust beam-related detailed configuration. For example, the base station 2e-03 may adjust a width of a beam or adjust a signal strength of a specific beam.

Figure 17:
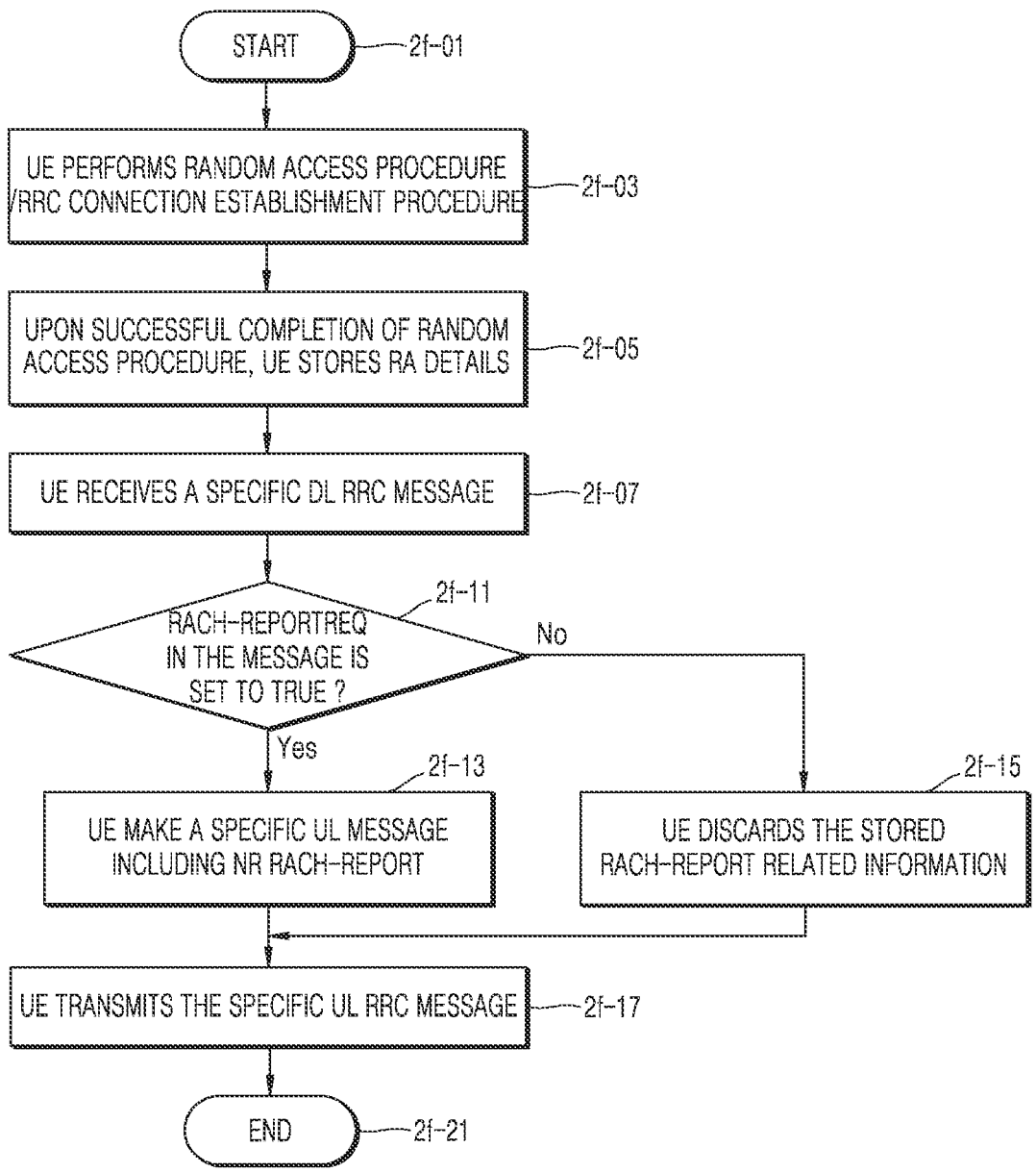
FIG. 17 is a diagram for describing an operation order of a UE reporting previous random access-related information, according to an embodiment.

FIG. 17 is a diagram for describing an operation order of a UE reporting previous random access-related information, according to an embodiment.

In FIG. 17, for example, it is assumed that the UE is in an idle mode and is camped to an NR base station. As described above, being camped may denote a state in which the UE selected one neighboring base station and staying there.

In operation 2f-03. the UE may perform a random access procedure for connection establishment to a base station due to transition to a connection mode for uplink data transmission or the like. Accordingly, the UE may perform random access via the procedure described above with reference to FIG. 15 and transmit an msg3 by adding an RRC connection request message to the msg3 to establish connection to the current base station and transit to the connection mode.

When the random access procedure is successfully completed, the UE may store at least one piece of information below generated during the random access procedure in operation 2f-05.

A total number of times a random access preamble is transmitted: When the random access procedure is not successful at one time and preamble retransmission occurs, the total number of preamble transmissions needs to be determined.

A number of times a non-contention-based random access preamble is transmitted: When the non-contention-based random access preamble is assigned, the UE may perform non-contention-based or contention-based random access according to a selected SSB during preamble transmission during the total preamble transmission, and accordingly, the total number of times the random access preamble is transmitted and the number of times the non-contention-based random access preamble is transmitted may be different.

A number of times a contention-based random access preamble is transmitted: When the non-contention-based random access preamble is assigned, the UE may perform non-contention-based or contention-based random access according to a selected SSB during preamble transmission during the total preamble transmission, and accordingly, the total number of times the random access preamble is transmitted and the number of times the contention-based random access preamble is transmitted may be different.

A number of changes between non-contention-based random access and contention-based random access: Described as above.

A number of power rampings: In NR, power is not increased when an SSB selected during preamble retransmission is changed and the base station needs to identify how many times such cases occurred.

A number of RAR reception failures: It is required to identify how many RARs are not received within an RAR window during the random access procedure.

A list of SSBs/CSI-RSs selected by the UE to perform the random access (or a list of SSBs/CSI-RSs selected but unsuccessful in random access) and a number of selections for each SSB/CSI-RS: The number of selections for each SSB may be determined to be used for detailed configuration adjustment regarding a beam determined to have a corresponding problem.

A list or number of SSBs or CSI-RSs that exceeded the above-described threshold value (i.e., rarsp-Threshold-SSB or rsrp-ThrehsoldCSI-RS) during last successful random access preamble transmission: Through the list or number, a width of beam or the like may be adjusted.

A number of times preamble transmission failed: When the random access is performed in an unlicensed band, a time for standing by until a channel is vacant because the channel is occupied by another device and thus a preamble is unable to be transmitted from a fastest PRACH occasion needs to be identified (Using this, an operation of moving to an operation frequency to another unlicensed band may be performed).

Then, in operation 2f-11, it may be determined whether the UE is requested to report the above-described stored information by receiving a message of a certain downlink RRC layer from the base station. In operation 2f-13, the UE may generate a message including the above-described stored information. In operation 2f-17, the UE may transmit the generated message to the base station. Accordingly, the base station is reported about a detailed situation about the previous successful random access of the UE and thereby adjust a random access channel within a cell or adjust beam-related detailed configuration. For example, the base station may adjust a width of a beam or adjust a signal strength of a specific beam.

When the UE received above-described RRC message but is not requested to report the information stored in the RRC message, the UE may delete the stored information in operation 2f-15.

Figure 18:
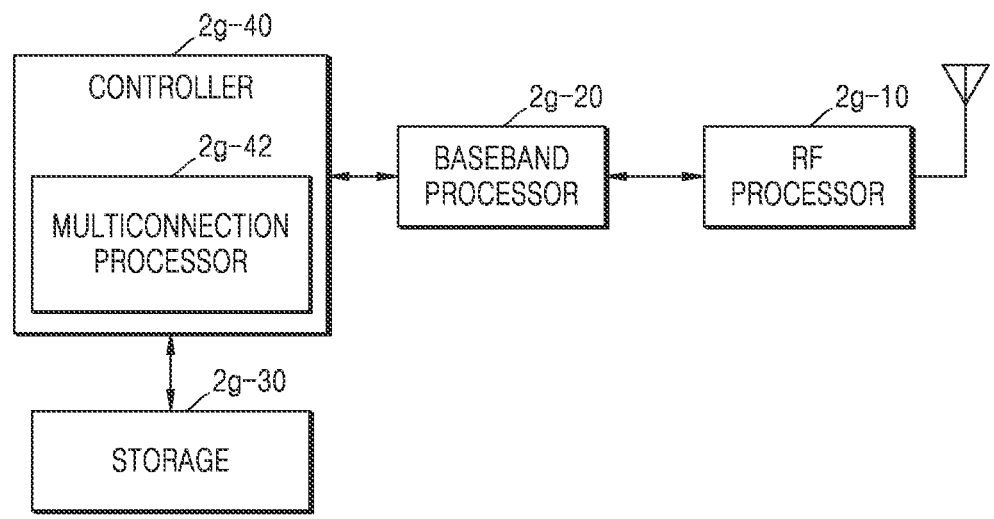
FIG. 18 is a block diagram of a configuration of a UE in a wireless communication system, according to an embodiment.

FIG. 18 is a block diagram of a configuration of a UE in a wireless communication system, according to an embodiment.

Referring to FIG. 18, the UE may include an RF processor 2g-10, a baseband processor 2g-20, a storage 2g-30, and a controller 2g-40. However, this is only an example, and the UE according to an embodiment may include more or fewer components.

The RF processor 2g-10 may perform functions for transmitting and receiving signals through radio channels, e.g., signal band conversion and amplification. That is, the RF processor 2g-10 up-converts a baseband signal provided from the baseband processor 2g-20, to an RF band signal and transmit the RF band signal through an antenna, and down-converts an RF band signal received through an antenna, to a baseband signal. For example, the RF processor 2g-10 may include at least one of a transmit filter, a receive filter, an amplifier, a mixer, an oscillator, a DAC, or an ADC. Although only a single antenna is illustrated in FIG. 18, the UE may include multiple antennas. The RF processor 2g-10 may include a plurality of RF chains. In addition, the RF processor 2g-10 may perform beamforming. For beamforming, the RF processor 2g-10 may adjust phases and amplitudes of signals transmitted or received through multiple antennas or antenna elements.

The baseband processor 2g-20 may convert between a baseband signal and a bitstream based on physical layer specifications of a system. For example, for data transmission, the baseband processor 2g-20 may generate complex symbols by encoding and modulating a transmit bitstream.

For data reception, the baseband processor 2g-20 may reconstruct a received bitstream by demodulating and decoding a baseband signal provided from the RF processor 2g-10. For example, according to an OFDM scheme, for data transmission, the baseband processor 2g-20 may generate complex symbols by encoding and modulating a transmit bitstream, map the complex symbols to subcarriers, and then configure OFDM symbols by performing IFFT and CP insertion. For data reception, the baseband processor 2g-20 may split a baseband signal provided from the RF processor 2g-10, in OFDM symbol units, reconstruct signals mapped to subcarriers by performing FFT, and then reconstruct a received bitstream by demodulating and decoding the signals.

The baseband processor 2g-20 and the RF processor 2g-10 may transmit and receive signals as described above. As such, each of the baseband processor 2g-20 and the RF processor 2g-10 may also be called a transmitter, a receiver, a transceiver, or a communicator. At least one of the baseband processor 2g-20 or the RF processor 2g-10 may include multiple communication modules to support multiple different radio access technologies. Also, at least one of the baseband processor 2g-20 or the RF processor 2g-10 may include multiple communication modules to process signals of different frequency bands. For example, the different radio access technologies may include wireless LAN (For example, IEEE 802.11), a cellular network (for example, LTE), and the like. The different frequency bands may include an SHF (e.g., 2.5 GHz and 5 GHz) band and a mmWave (e.g., 60 GHz) band.

The storage 2g-30 may store data for operation of the base station described above, e.g., basic programs, application programs, and configuration information. In particular, the storage 2g-30 may store information related to a wireless access node performing wireless communication by using a wireless LAN access technology. The storage 2g-30 may provide the stored data upon request by the controller 2g-40.

The controller 2g-40 may control overall operations of the UE. For example, the controller 2g-40 may transmit and receive signals through the baseband processor 2g-20 and the RF processor 2g-10. The controller 2g-40 may record and read data on and from the storage 2g-30. In this regard, the controller 2g-40 may include at least one processor. For example, the controller 2g-40 may include a CP for controlling communications and an AP for controlling an upper layer such as an application program. According to an embodiment of the present disclosure, the controller 2g-40 may include a multiconnection processor 2g-42 performing a process for operating in a multiconnection mode. For example, the controller 2g-40 may control the UE to perform the procedure shown in FIG. 16.

Upon receiving a message to report detailed information related to previous successful random access from the base station, the controller 2g-40 according to an embodiment of the present disclosure may instruct the UE to report stored information to the base station to help the base station to configure a random access resource.

Figure 19:
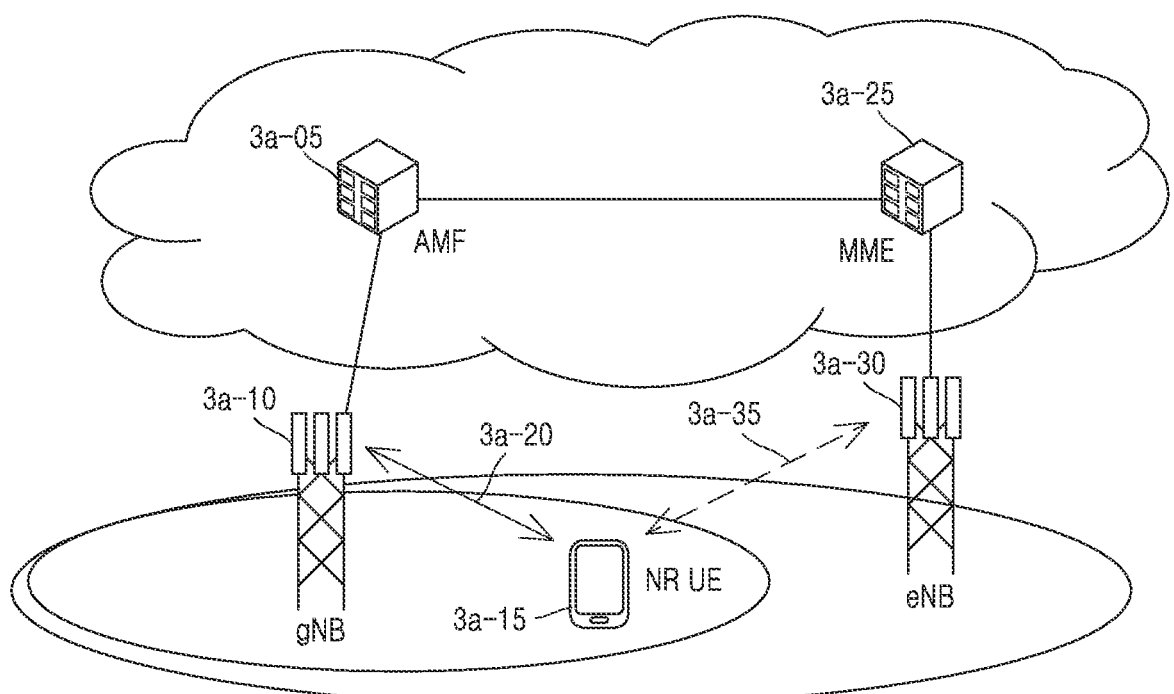
FIG. 19 is a diagram of a structure of a next-generation mobile communication system to which an embodiment is applied.

FIG. 19 is a diagram of a structure of a next-generation mobile communication system to which an embodiment is applied.

Referring to FIG. 19, as illustrated, a radio access network of the next-generation mobile communication system (5G or NR) includes a new radio node B (NR NB, NR gNB, or NR base station) 3a-10 and an AMF 3a-05 (new radio core network (NR CN) or next generation core network (NG CN). A new radio user equipment (NR UE) or terminal 3a-15 may access an external network via the gNB 3a-10 and the AMF 3a-05.

In FIG. 19, the gNB 3a-10 may correspond to an eNB of an LTE system. The gNB 3a-10 is connected to the NR UE 3a-15 through radio channels and may provide superior services 3a-20 compared to an existing NB. Because all user traffic data is serviced through shared channels in the next-generation mobile communication system, an entity for collating buffer status information of UEs, available transmission power status information, channel status information, etc. and performing scheduling is required and such operations may be performed by the gNB 3a-10. A single gNB 3a-10 may control multiple cells. An existing next-generation mobile communication system (5G or NR system) may have a maximum bandwidth greater than an existing maximum bandwidth of LTE to achieve an ultrahigh data rate, and beamforming technology may be additionally applied using OFDM as radio access technology. Also, adaptive modulation and coding (AMC) may be used to determine a modulation scheme and a channel coding rate in accordance with a channel status of the UE. The AMF 3a-05 may perform functions such as mobility support, bearer configuration, and quality of service (QoS) configuration. The AMF 3a-05 is an entity for performing a mobility management function and various control functions for the UE and may be connected to multiple base stations. The next generation mobile communication system (5G or NR system) may cooperate with the LTE system, and the AMF 3a-05 may be connected to an MME 3a-25 through a network interface. The MME may be connected to an eNB 3a-30 that is an existing base station. The UE supporting LTE-NR dual connectivity may transmit and receive data while maintaining a connection to the eNB 3a-30, in operation 3a-35, in addition with the gNB 3a-10.

Figure 20:
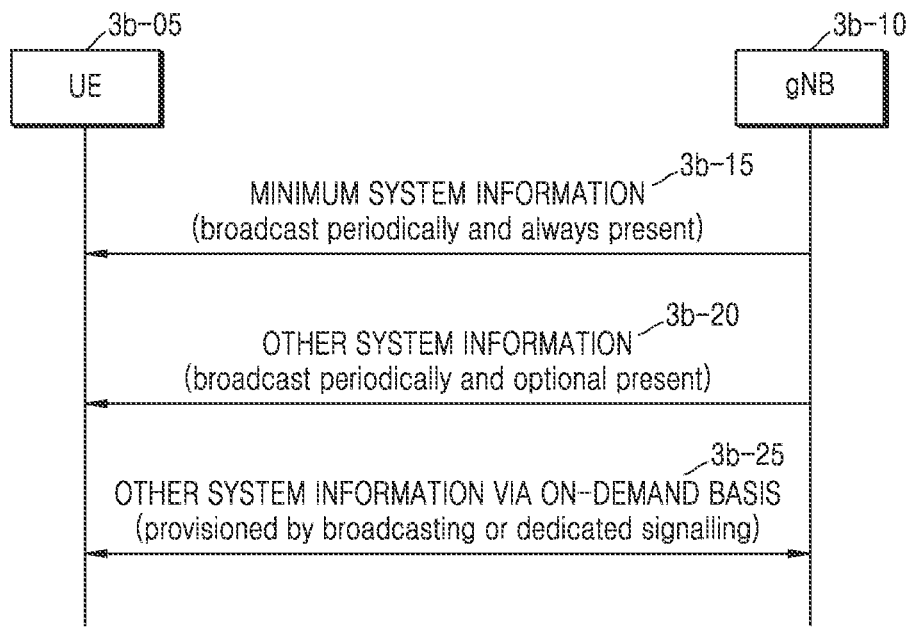
FIG. 20 is a diagram for describing a method by which a next-generation mobile communication system provides system information, to which an embodiment is applied.

FIG. 20 is a diagram for describing a method by which a next-generation mobile communication system provides system information, to which an embodiment is applied.

The system information broadcasted by a base station 3b-10 in the next-generation mobile communication system may be largely divided into minimum system information (SI) and other SI. In operation 3b-15, the minimum SI may be always broadcasted periodically and may include configuration information required for initial access and SI scheduling information required to receive the other SI broadcasted periodically or based on a request. MIB and SIB1 belong to the minimum SI. Basically, the other SI may include all configuration information not included in the minimum SI.

In operation 3b-20, the other SI may be provided to a UE 3b-05 periodically or by being broadcasted.

Alternatively, in operation 3b-25, the other SI may be provided to the UE 3b-05 via broadcasting or dedicated signaling, based on a UE request.

When the other SI is received upon a request, the UE 3b-05 needs to identify whether the other SI is valid in the base station 3b-10 or is broadcasted upon a request of another UE, before performing the request. The UE 3b-05 may identify the above matter via specific information provided by the minimum SI. The UE 3b-05 in an idle mode (RRC_IDLE) or inactive mode (RRC_INACTIVE) may request the other SI without changing a current RRC state. On the other hand, the UE 3b-05 in a connection mode (RRC_CONNECTED) may request and receive the other SI via dedicated RRC signaling. The other SI may be broadcasted for a determined period every set period. Public warning system (PWS) information may be classified and provided as the other SI. Whether to provide the other SI to the UE 3b-05 via broadcasting or dedicated RRC signaling may be determined according to network implementation.

Figure 21:
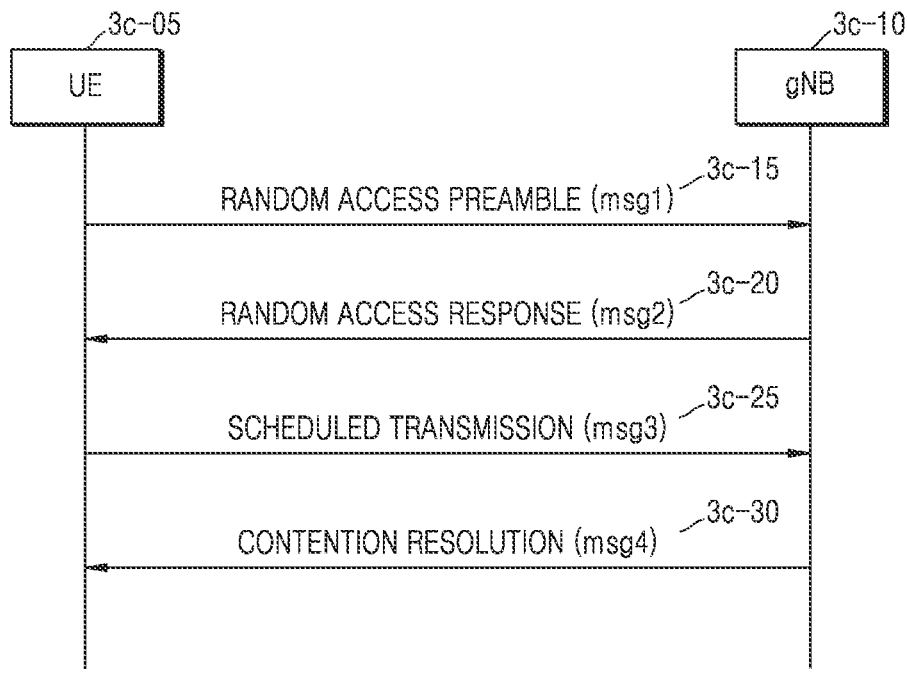
FIG. 21 is a diagram for describing a random-access process in an LTE system, according to an embodiment.

FIG. 21 is a diagram for describing a random access process in an LTE system, according to an embodiment.

Random access may be performed for uplink synchronization or when data is transmitted to a network. According to an embodiment, the random access may be performed when transiting from an idle mode to a connection mode, when performing RRC reestablishment, when performing handover, or when starting uplink/downlink data. Upon receiving a dedicated preamble from a base station 3c-10, a UE 3c-05 may apply the preamble and transmit the preamble. Alternatively, the UE 3c-05 may select one of two preamble groups and select a preamble in the selected group. It is assumed that the groups may include a group A and a group B.

The UE 3c-05 may select a preamble in the group A when a channel quality state is better than a specific threshold value and a size of msg3 is greater than a specific threshold value, and select a preamble in the group B otherwise.

In operation 3c-15, the UE 3c-05 may transmit the preamble in an $n^{th}$ subframe. When the preamble is transmitted in the $n^{th}$ subframe, the UE 3c-05 may start an RAR window from an $n+3^{th}$ subframe and monitor whether RAR of operation 3c-20 is transmitted in a window time section. Scheduling information of the RAR may be indicated by RA-RNTI of PDCCH. The RA-RNTI may be derived by using a time when the preamble was transmitted and a wireless resource location on a frequency axis. The RAR may include a timing advance command, uplink grant, and temporary C-RNTI. When the RAR is successfully received in the RAR window, the UE 3c-05 may transmit an msg3 by using the UL grant included in the RAR, in operation 3c-25. The msg3 may include different information depending on a purpose of the random access. Table 2 below shows information included in the msg3 according to an embodiment.

TABLE 2

| CASE | Message 3 Contents |
| --- | --- |
| RRC CONNECTION SETUP | CCCH SDU |
| RRC RE-ESTABLISHMENT | CCCH SDU, BSR (if grant is enough), PHR (If triggered & grant is enough) |
| Handover (random preamble ) | C-RNTI CE, BSR, PHR, (part of) DCCH SDU |
| Handover (dedicate preamble ) | BSR, PHR, (part of) DCCH SDU |
| UL resume | C-RNTI CE, BSR, PHR, (part of) DCCH/DTCH SDU |
| PDCCH order (random preamble ) | C-RNTI CE, SSR, PHR, (part of) DCCH/DTCH SDU |
| PDCCH order (dedicate preamble ) | BSR, PHR, (part of) DCCH/DTCH SDU |

When the UE 3c-05 received the RAR in the $n^{th}$ subframe, the msg3 is transmitted in an $n+6^{th}$ subframe. HARQ may be applied from the msg3. After the msg3 is transmitted, the UE 3c-05 runs a specific timer and may monitor a contention resolution (CR) message of operation 3c-30 until the timer expires. The CR message may include, in addition to CR MAC CE, an RRC connection setup or RRC connection reestablishment message depending on the purpose of the random access.

Figure 22:
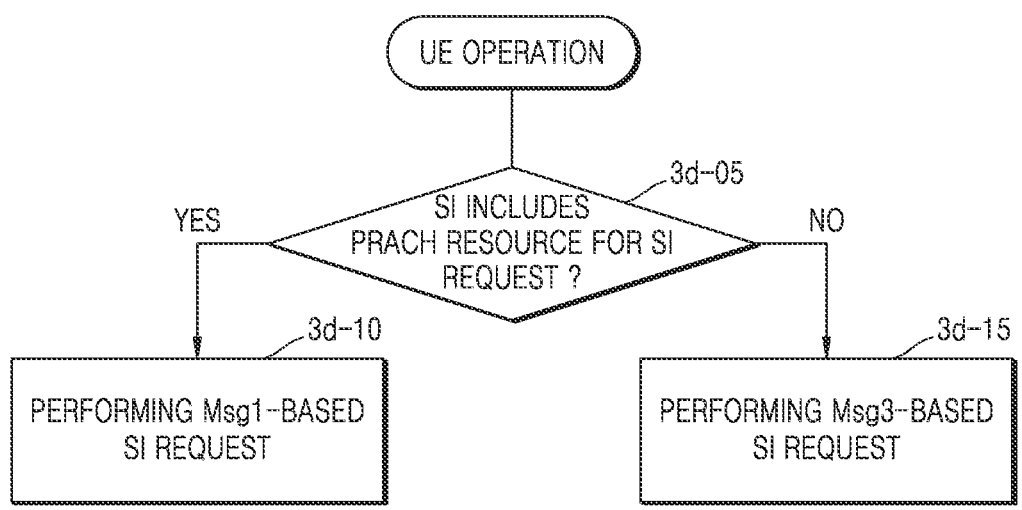
FIG. 22 is a diagram for describing a method of selecting a msg1-based or msg3-based system information (SI) request method, according to an embodiment.

FIG. 22 is a diagram for describing a method of selecting a msg1-based or msg3-based SI request method, according to an embodiment.

A UE may use random access to request SI other than minimum SI. The UE may request a network for the SI to be received by using an msg1 (preamble) or an msg3.

In operation 3d-05, the UE may determine whether the minimum SI that is periodically broadcasted includes PRACH resource information usable for an SI request. The PRACH resource information is wireless resource information capable of transmitting preamble identification (ID) (or index) information (prach_configIndex) and a preamble used during the SI request.

When the PRACH resource information is included, the UE may request the SI other than the minimum SI by using the msg1 dedicated to the SI request, in operation 3d-10. Otherwise, the UE may request the SI other than the minimum SI by using the msg3 in operation 3d-15. Here, the UE may transmit a preamble generally used in random access.

The present disclosure proposes a method of reporting certain information to a base station during a random access process performed to request SI. The above-described method may be extendedly applied to a random access process triggered for another purpose. The above information may be used by a base station to optimize a service area later.

Figure 23:
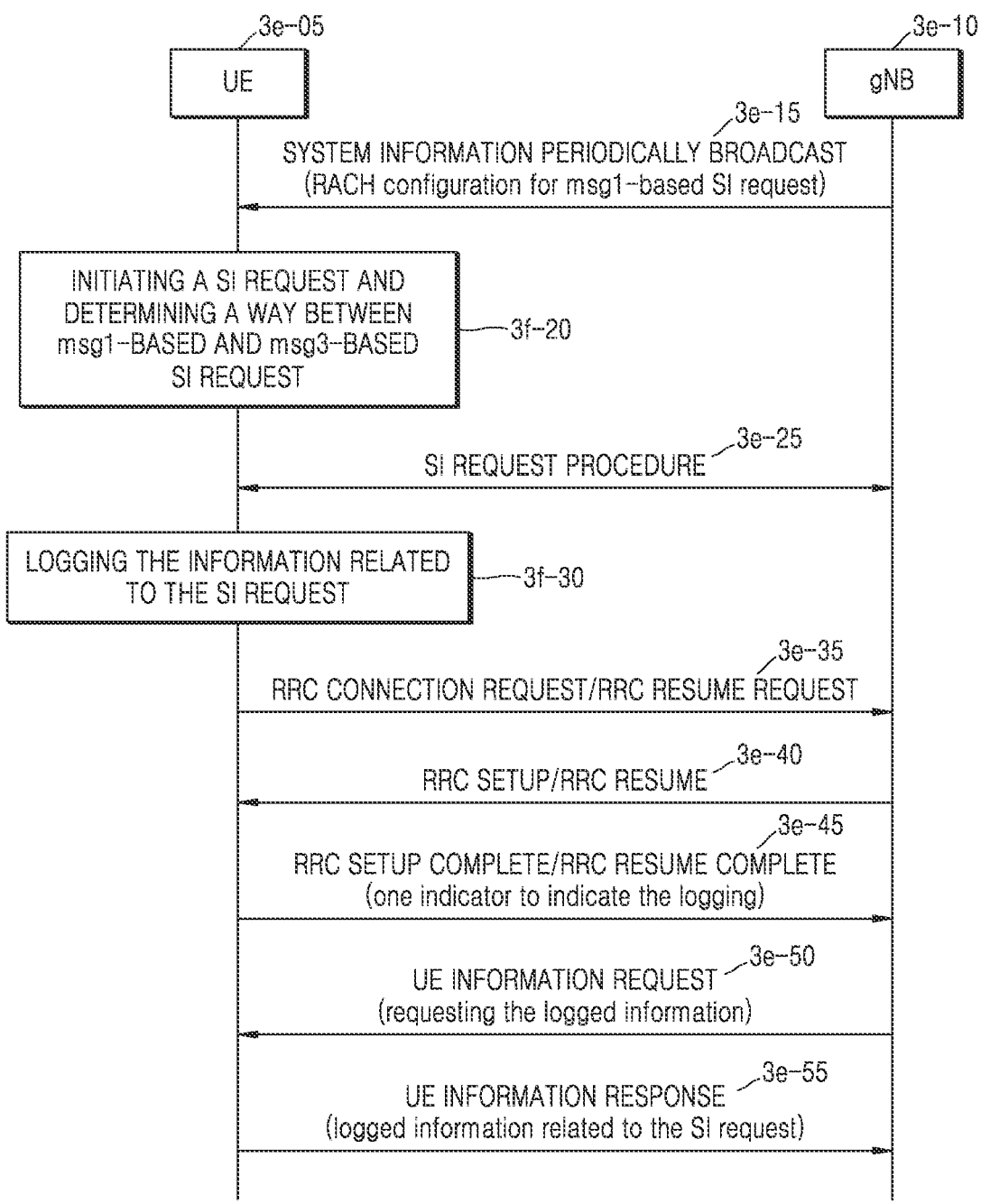
FIG. 23 is a flowchart for describing a process of reporting information related to an SI request process, according to an embodiment.

FIG. 23 is a flowchart for describing a process of reporting information related to an SI request process, according to an embodiment.

In operation 3e-15, a UE 3-05 may receive minimum SI always periodically broadcasted from a base station 3e-10. SI may include random access configuration information usable by the UE 3-05 to request SI. When the configuration information is provided, the UE 3-05 may perform an msg1-based SI request process. Otherwise, the UE 3-05 may perform an msg3-based SI request process.

When the UE 3-05 requires specific SI other than the minimum SI and does not include valid SI, the UE 3-05 may trigger the msg1 or msg3-based SI request process in operation 3e-20.

While performing the above process, the UE 3-05 may perform a random access process in operation 3e-25. In operation 3e-30, the UE 3-05 may record information related to the random access process. The recorded information may include following examples.

ID information of a target serving cell attempting random access, i.e., a physical cell identity (PCI), an absolute radio frequency channel number (ARFCN), or a cell global identity (CGI)

Time information when attempting the random access, for example, a time when an initial preamble is transmitted for an SI request, a time when the SI request is completed (the completed time is a time when an ACK feedback message for a preamble is received), a time when requested SI is successfully received, an elapsed time after the initial preamble is received, an elapsed time after the SI request is completed, and an elapsed time after the requested SI is successfully received Random access statistics information, i.e., a number of transmitted preambles Whether contention is detected with respect to at least one of the transmitted preambles Whether at least one of the transmitted preambles or a preamble that is transmitted last reached maximum UE transmission power Whether the SI request process was successful or failed and a number of successes or failures A public land mobile network (PLMN) selected by an upper layer (UE NAS layer) from among PLMNs belonging to plmn-IdentityList IE included in SI broadcasted by a cell performing the SI request process, or entire PLMNs belonging to the plmn-IdentityList. The IE stores ID of the PLMN supported by the cell.

There may be one or more SI requests in an idle mode (RRC_Idle) or inactive mode (RRC_Inactive). Accordingly, the information for a last SI request or a pre-defined latest $M^{th}$ SI request is recorded.

The UE 3-05 may transmit an RRC connection request or RRC resume request message to the base station 3e-10 in operation 3e-35 to transit from the idle mode (RRC_Idle) or inactive mode (RRC_Inactive) to a connection mode (RRC_Connected). In operation 3e-40, the base station 3e-10 may transmit an RRC setup or RRC resume message to the UE. In operation 3e-45, the UE 3-05 may transmit an RRC setup complete or RRC resume complete message to the base station 3e-10. The RRC message may include one indicator. The indicator may indicate whether there is the recorded information not reported by the UE 3-05 in the idle or inactive mode. In addition, the indicator may indicate that there is the recorded information regarding the last SI request or the pre-defined latest $M^{th}$ SI request.

After checking the indicator, the base station 3e-10 may determine that the UE 3-05 includes the recorded information to be reported. In operation 3e-50, the base station 3e-10 may instruct the UE 3-05 to report the recorded information by using a certain RRC message and a UE information request. The indicator is a 1-bit indicator and may indicate to report the entire recorded information. In addition, when there is recorded information for one or more SI requests, a certain indicator may be used to selectively request recorded information for the last SI request or a pre-defined latest $N^{th}$ SI request. In operation 3e-55, upon receiving the certain RRC message and the UE information request, the UE 3-05 may use a certain RRC message and a UE information response message to report the recorded information to the base station 3e-10.

According to another embodiment, a method of omitting the indicator may be suggested. According to an embodiment, the base station 3e-10 may not determine whether the UE 3-05 includes the recorded information, and may instruct the UE 3-05 to report the recorded information by using a certain RRC message and the UE information request. Upon receiving the instruction, the UE 3-05 may report the recorded information to the base station 3e-10 by using a certain RRC message and a UE information response message when there is the recorded information that is not reported. Otherwise, the UE 3e-05 may not report any corresponding information regarding the request or report an indicator indicating that there is no recorded information to the base station 3e-10.

Figure 24:
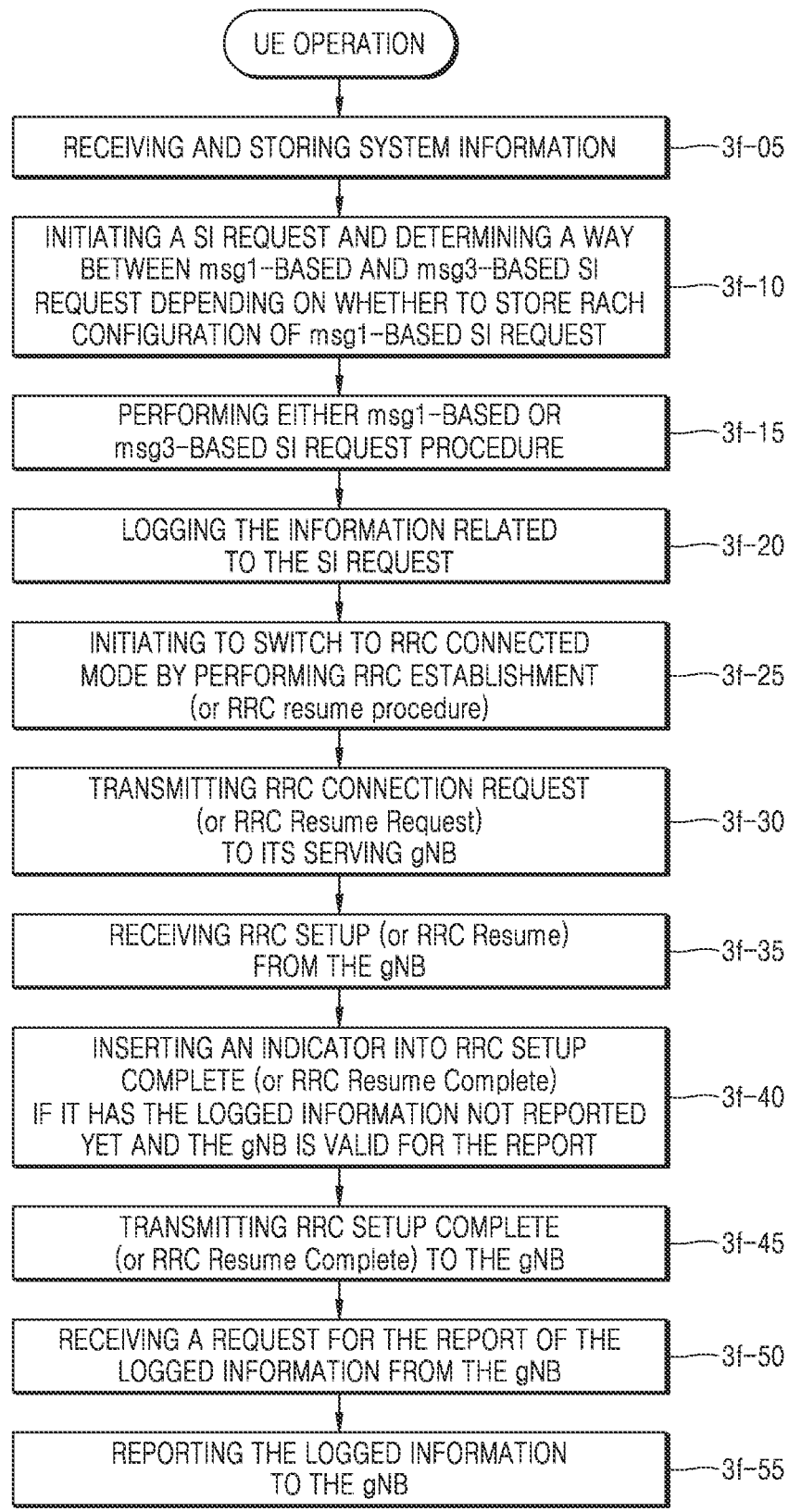
FIG. 24 is a flowchart of an operation of a UE, according to an embodiment.

FIG. 24 is a flowchart of an operation of a UE, according to an embodiment.

In operation 3f-05, the UE may receive SI from a base station and store the SI.

In operation 3f-10, the UE may initiate an msg1-based or msg3-based SI request process depending on whether minimum SI includes random access configuration information required for the msg1-based SI request process.

In operation 3f-15, the UE may perform the determined msg1-based or msg3-based SI request process.

In operation 3f-20, the UE may record certain information collectable during the SI request process. The information has been described in detail with reference to the previous drawing. Also, the UE may store entire PLMNs belonging to plmn-IdentityList included in SI broadcasted by a cell performing the SI request process or a PLMN selected by an upper layer (UE NAS layer) from among the PLMNs.

In operation 3f-25, the UE may initiate a process of switching from an idle mode or inactive mode to a connection mode. In other words, the UE may trigger an establishment or resume process.

In operation 3f-30, the UE may transmit, to the base station, an RRC connection request when switching from the idle mode to the connected mode, and an RRC resume request message when switching from the inactive mode to the connected mode.

In operation 3f-35, the UE may receive, from the base station, an RRC setup or RRC resume message in response to the transmitted message.

In operation 3f-40, when the stored PLMN is included in a plmn-IdentityList broadcasted by a current serving cell or when a last registered PLMN (RPLMN) or selected PLMN is the same as the stored PLMN, the UE may store one indicator indicating that there is recorded information that is not reported in an RRC setup complete or RRC resume complete message.

In operation 3f-45, the UE may transmit the RRC setup complete or RRC resume complete message to the base station.

In operation 3f-50, the UE may receive, from the base station through a certain RRC message, an indicator for reporting the recorded information.

In operation 3f-55, the UE may report the recorded information to the base station by storing the recorded information in a certain RRC message.

Figure 25:
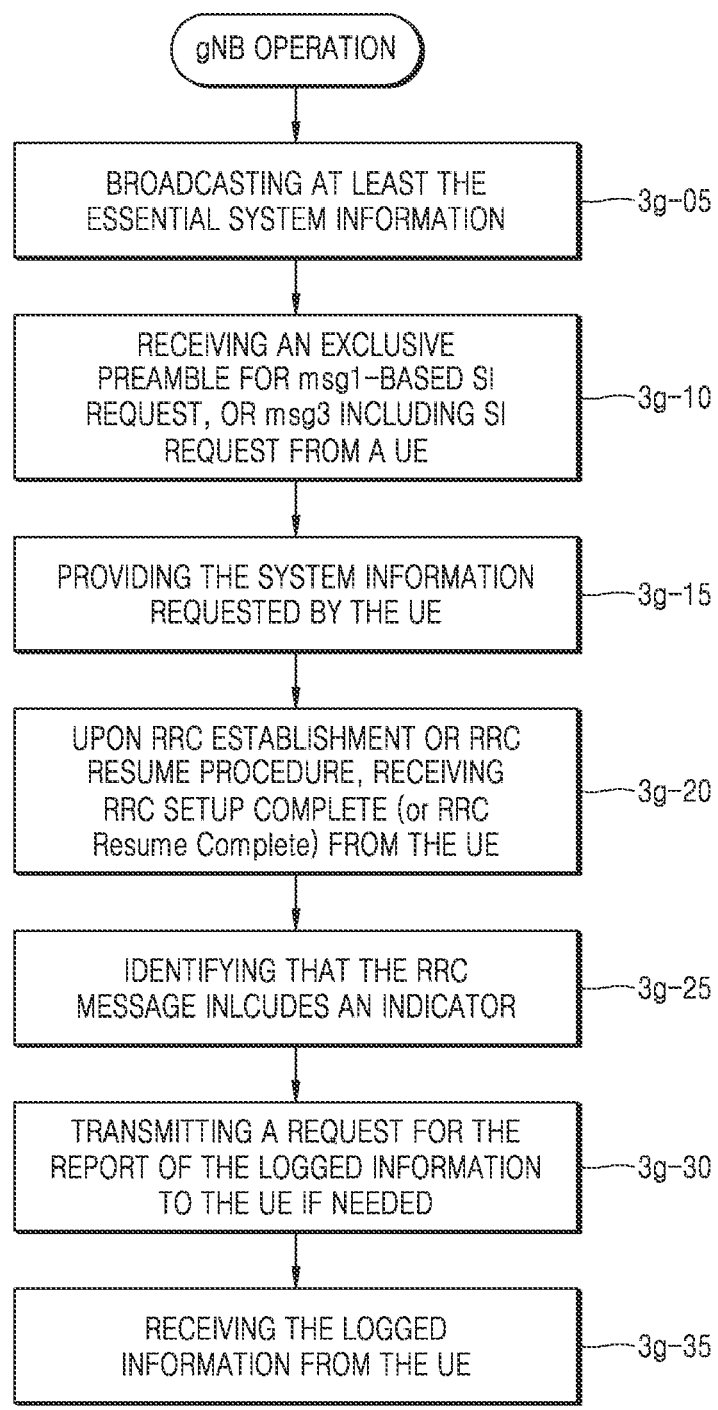
FIG. 25 is a flowchart of an operation of a base station, according to an embodiment.

FIG. 25 is a flowchart of an operation of a base station, according to an embodiment.

In operation 3g-05, the base station may always broadcast minimum SI periodically. The base station may store, in SI, random access configuration information required for an msg1-based SI request process.

In operation 3g-10, the base station may receive, from a specific UE, an SI request dedicated preamble or an msg3 including an SI request.

In operation 3g-15, the base station may broadcast SI requested by the preamble or msg3.

In operation 3g-20, the base station may receive, from the UE, an RRC setup complete or RRC resume complete message during a process of initiating an RRC establishment or RRC resume process with the UE. The UE may transmit the RRC setup complete message when switching from an idle mode to a connection mode and transmit the RRC resume complete message when switching from an inactive mode to the connection mode.

In operation 3g-25, the base station may identify one indicator included in the above-described message. The indicator may indicate that the UE includes recorded information.

In operation 3g-30, the base station may instruct the UE to report the recorded information by using a certain RRC message.

In operation 3g-35, the base station may receive the recorded information from the UE via a certain RRC message.

Figure 26:
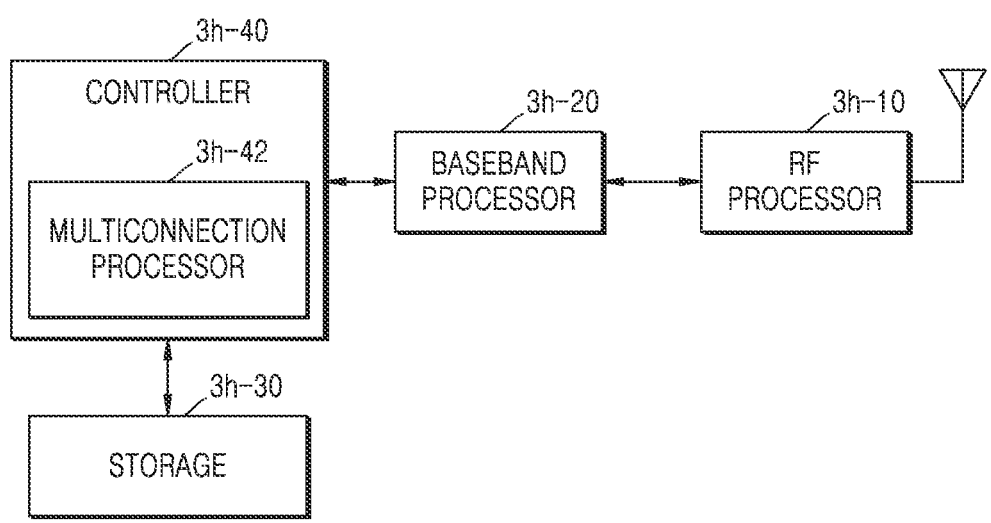
FIG. 26 is a block diagram of an internal structure of a UE, according to an embodiment.

FIG. 26 is a block diagram of an internal structure of a UE, according to an embodiment.

Referring to FIG. 26, the UE may include an RF processor 3h-10, a baseband processor 3h-20, a storage 3h-30, and a controller 3h-40.

The RF processor 3h-10 may perform functions for transmitting and receiving signals through radio channels, e.g., signal band conversion and amplification. That is, the RF processor 3*h*-10 may up-convert a baseband signal provided from the baseband processor 3*h*-20, to an RF band signal and transmit the RF band signal through an antenna, and down-convert an RF band signal received through an antenna, to a baseband signal. For example, the RF processor 3*h*-10 may include at least one of a transmit filter, a receive filter, an amplifier, a mixer, an oscillator, a DAC, or an ADC. Although only a single antenna is illustrated in FIG. 26, the UE may include multiple antennas. The RF processor 3*h*-10 may include a plurality of RF chains. In addition, the RF processor 3*h*-10 may perform beamforming. For beamforming, the RF processor 3*h*-10 may adjust phases and amplitudes of signals transmitted or received through multiple antennas or antenna elements. The RF processor 3*h*-10 may perform MIMO and may receive data of multiple layers in the MIMO operation.

The baseband processor 3*h*-20 may convert between a baseband signal and a bitstream based on physical layer specifications of a system. For example, for data transmission, the baseband processor 3*h*-20 may generate complex symbols by encoding and modulating a transmit bitstream. For data reception, the baseband processor 3*h*-20 may reconstruct a received bitstream by demodulating and decoding a baseband signal provided from the RF processor 3*h*-10. For example, according to an OFDM scheme, for data transmission, the baseband processor 3*h*-20 may generate complex symbols by encoding and modulating a transmit bitstream, map the complex symbols to subcarriers, and then configure OFDM symbols by performing IFFT and CP insertion. For data reception, the baseband processor 3*h*-20 may split a baseband signal provided from the RF processor 3*h*-10, in OFDM symbol units, reconstruct signals mapped to subcarriers by performing FFT, and then reconstruct a received bitstream by demodulating and decoding the signals.

The baseband processor 3*h*-20 and the RF processor 3*h*-10 may transmit and receive signals as described above. As such, each of the baseband processor 3*h*-20 and the RF processor 3*h*-10 may also be called a transmitter, a receiver, a transceiver, or a communicator. At least one of the baseband processor 3*h*-20 or the RF processor 3*h*-10 may include multiple communication modules to support multiple different radio access technologies. Also, at least one of the baseband processor 3*h*-20 or the RF processor 3*h*-10 may include multiple communication modules to process signals of different frequency bands. For example, the different radio access technologies may include wireless LAN (For example, IEEE 802.11), a cellular network (for example, LTE), and the like. The different frequency bands may include a super high frequency (SHF) (e.g., 2.5 GHz and 5 GHz) band and a mmWave (e.g., 60 GHz) band.

The storage 3*h*-30 may store data for operation of the UE, e.g., basic programs, application programs, and configuration information. The storage 3*h*-30 may provide the stored data upon request by the controller 3*h*-40.

The controller 3*h*-40 may control overall operations of the terminal. For example, the controller 3*h*-40 may transmit and receive signals through the baseband processor 3*h*-20 and the RF processor 3*h*-10. The controller 3*h*-40 may record and read data on and from the storage 3*h*-30. In this regard, the controller 3*h*-40 may include at least one processor. For example, the controller 3*h*-40 may include a CP for controlling communications and an AP for controlling an upper layer such as an application program.

Figure 27:
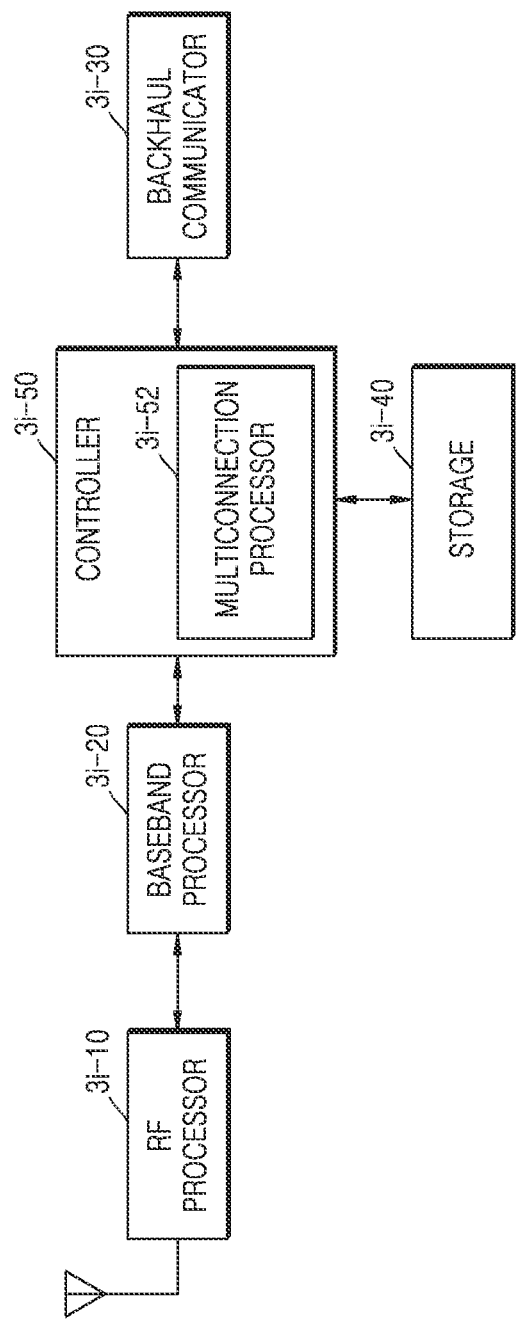
FIG. 27 is a block diagram of a configuration of a base station, according to an embodiment.

FIG. 27 is a block diagram of a configuration of a base station, according to an embodiment.

Referring to FIG. 27, the base station may include an RF processor 3*i*-10, a baseband processor 3*i*-20, a backhaul communicator 3*i*-30, a storage 3*i*-40, and a controller 3*i*-50.

The RF processor 3*i*-10 may perform functions for transmitting and receiving signals through radio channels, e.g., signal band conversion and amplification. That is, the RF processor 3*i*-10 may up-convert a baseband signal provided from the baseband processor 3*i*-20, to an RF band signal and transmit the RF band signal through an antenna, and down-convert an RF band signal received through an antenna, to a baseband signal. For example, the RF processor 3*i*-10 may include at least one of a transmit filter, a receive filter, an amplifier, a mixer, an oscillator, a DAC, or an ADC. Although only a single antenna is illustrated in FIG. 27, the RF processor 3*i*-10 may include a plurality of antennas. The RF processor 3*i*-10 may include a plurality of RF chains. In addition, the RF processor 3*i*-10 may perform beamforming. For beamforming, the RF processor 3*i*-10 may adjust phases and amplitudes of signals transmitted or received through a plurality of antennas or antenna elements. The RF processor may perform a downlink MIMO operation by transmitting at least one layer.

The baseband processor 3*i*-20 may convert between a baseband signal and a bitstream based on physical layer specifications of a first radio access technology. For example, for data transmission, the baseband processor 3*i*-20 may generate complex symbols by encoding and modulating a transmit bitstream. For data reception, the baseband processor 3*i*-20 may reconstruct a received bitstream by demodulating and decoding a baseband signal provided from the RF processor 3*i*-10. For example, according to an OFDM scheme, for data transmission, the baseband processor 3*i*-20 may generate complex symbols by encoding and modulating a transmit bitstream, map the complex symbols to subcarriers, and then configure OFDM symbols by performing IFFT and CP insertion. For data reception, the baseband processor 3*i*-20 may split a baseband signal provided from the RF processor 3*i*-10, in OFDM symbol units, reconstruct signals mapped to subcarriers by performing FFT, and then reconstruct a received bitstream by demodulating and decoding the signals. The baseband processor 3*i*-20 and the RF processor 3*i*-10 may transmit and receive signals as described above. As such, each of the baseband processor 3*i*-20 and the RF processor 3*i*-10 may also be called a transmitter, a receiver, a transceiver, a communicator, or a wireless communicator.

The backhaul communicator 3*i*-30 may provide an interface for communicating with other nodes in a network. In other words, the backhaul communicator 3*i*-30 may convert a bit string transmitted from a main base station to another node, for example, an auxiliary base station or a core network, into a physical signal, and convert a physical signal received from the other node into a bit string.

The storage 3*i*-40 may store data for operation of the main base station described above, e.g., basic programs, application programs, and configuration information. In particular, the storage 3*i*-40 may store information about bearers allocated for a connected UE, a measurement report transmitted from the connected UE, etc. The storage 3*i*-40 may store criteria information used to determine whether to provide or release multi-connectivity to or from the UE. The storage 3*i*-40 may provide the stored data upon request by the controller 3*i*-50.

The controller 3*i*-50 may control overall operations of the main base station. For example, the controller 3*i*-50 may transmit and receive signals through the baseband processor 3*i*-20 and the RF processor 3*i*-10 or through the backhaul communicator 3i-30. The controller 3i-50 may record and read data on and from the storage 3i-40. In this regard, the controller 3i-50 may include at least one processor.

The methods according to the embodiments described in the claims or the detailed description of the present disclosure may be implemented in hardware, software, or a combination of hardware and software.

When the methods are implemented in software, a computer-readable recording medium or computer program product having one or more programs (software modules) recorded thereon may be provided. The one or more programs recorded on the computer-readable recording medium or computer program product are configured to be executable by one or more processors in a device. The one or more programs include instructions to execute the methods according to the embodiments described in the claims or the detailed description.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according to the embodiments of the present disclosure. Another storage device on the communication network may also be connected to the apparatus performing the embodiments of the present disclosure.

In the afore-described embodiments of the present disclosure, elements included in the present disclosure are expressed in a singular or plural form according to the embodiments. However, the singular or plural form is appropriately selected for convenience of explanation and the present disclosure is not limited thereto. As such, an element expressed in a plural form may also be configured as a single element, and an element expressed in a singular form may also be configured as plural elements.

Meanwhile, the embodiments described with reference to the present specification and the drawings are merely illustrative of specific examples to easily facilitate description and understanding of the present disclosure, and are not intended to limit the scope of the present disclosure. In other words, it will be apparent to one of ordinary skill in the art that other modifications based on the technical ideas of the present disclosure are feasible. Also, the embodiments may be combined with each other as required. For example, a portion of one embodiment of the disclosure and a portion of another embodiment of the present disclosure may be combined with each other. In addition, modified examples of the embodiments based on the technical ideas of the embodiments may be implemented in other systems, such as LTE systems, 5G or NR communication systems.

The invention claimed is:

1. A method, performed by a user equipment (UE), of reporting information about a random access procedure, the method comprising:

storing the information about the random access procedure, wherein the information about the random access procedure comprises a list regarding at least one synchronization signal block (SSB) selected by UE and a list regarding random access attempts associated with the at least one SSB with received power reference signal (RSRP) exceeding a configured threshold value;

receiving, from a base station, a request for reporting the information about the random access procedure; and transmitting, to the base station, a message including the stored information about the random access procedure.

2. The method of claim 1, wherein the information about the random access procedure further comprises information about a number of times a random access preamble is transmitted.

3. The method of claim 1, further comprising providing, to the base station, information about whether a function of reporting the information about the random access procedure is supported.

4. The method of claim 1, further comprising receiving, from the base station, configuration information about a random access procedure configured based on the information about the random access procedure.

5. A method, performed by a base station, of obtaining information about a random access procedure, the method comprising:

transmitting, to a user equipment (UE), a request for reporting the information about the random access procedure; and receiving, from the UE, a message including the information about the random access procedure, wherein the information about the random access procedure comprises a list regarding at least one synchronization signal block (SSB) selected by UE and a list regarding random access attempts associated with the at least one SSB with received power reference signal (RSRP) exceeding a configured threshold value.

6. The method of claim 5, wherein the information about the random access procedure further comprises information about a number of times a random access preamble is transmitted.

7. The method of claim 5, further comprising receiving, from the UE, information about whether a function of reporting the information about the random access procedure is supported.

8. The method of claim 5, further comprising transmitting, to the UE, configuration information about a random access procedure configured based on the information about the random access procedure.

9. A user equipment (UE) for reporting information about a random access procedure, the UE comprising:

a transceiver; and a processor coupled with to the transceiver and configured to:

store the information about the random access procedure, wherein the information about the random access procedure comprises a list regarding at least one synchronization signal block (SSB) selected by UE and a list regarding random access attempts associated with the at least one SSB with received power reference signal (RSRP) exceeding a configured threshold value, receive, from a base station, a request for reporting the information about the random access procedure, and transmit, to the base station, a message including the stored information about the random access procedure.

10. The UE of claim 9, wherein the information about the random access procedure further comprises information about a number of times a random access preamble is transmitted.

11. The UE of claim 9, wherein the processor is further configured to provide, to the base station, information about whether a function of reporting the information about the random access procedure is supported.

12. The UE of claim 9, wherein the processor is further configured to receive, from the base station, configuration information about a random access procedure configured based on the information about the random access procedure.

13. A base station for obtaining information about a random access procedure, the base station comprising:
    a transceiver; and
    a processor coupled with the transceiver and configured to:
        transmit, to a user equipment (UE), a request for reporting the information about the random access procedure, and
        receive, from the UE, a message including the information about the random access procedure,
    wherein the information about the random access procedure comprises a list regarding at least one synchronization signal block (SSB) selected by UE and a list regarding random access attempts associated with the at least one SSB with received power reference signal (RSRP) exceeding a configured threshold value.

14. The base station of claim 13, wherein the information about the random access procedure further comprises information about a number of times a random access preamble is transmitted.

15. The base station of claim 13, wherein the processor is further configured to receive, from the UE, information about whether a function of reporting the information about the random access procedure is supported.

16. The base station of claim 13, wherein the processor is further configured to transmit, to the UE, configuration information about a random access procedure configured based on the information about the random access procedure.

* * * * *